United States Patent
Hamad et al.

(10) Patent No.: US 9,581,062 B2
(45) Date of Patent: Feb. 28, 2017

(54) REVERSIBLE SOLID ADSORPTION METHOD AND SYSTEM UTILIZING WASTE HEAT FOR ON-BOARD RECOVERY AND STORAGE OF $CO_2$ FROM MOTOR VEHICLE INTERNAL COMBUSTION ENGINE EXHAUST GASES

(75) Inventors: Esam Zaki Hamad, Dhahran (SA); Wajdi Issam Al-Sadat, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 415 days.

(21) Appl. No.: 13/980,508

(22) PCT Filed: Jan. 20, 2012

(86) PCT No.: PCT/US2012/022008
§ 371 (c)(1),
(2), (4) Date: Jul. 18, 2013

(87) PCT Pub. No.: WO2012/100149
PCT Pub. Date: Jul. 26, 2012

(65) Prior Publication Data
US 2013/0298532 A1    Nov. 14, 2013

Related U.S. Application Data

(60) Provisional application No. 61/434,694, filed on Jan. 20, 2011.

(51) Int. Cl.
*F01N 3/00* (2006.01)
*B01D 53/04* (2006.01)
(Continued)

(52) U.S. Cl.
CPC ........... *F01N 3/00* (2013.01); *B01D 53/0462* (2013.01); *B01D 53/62* (2013.01); *B01D 53/92* (2013.01);
(Continued)

(58) Field of Classification Search
CPC ...... F01N 3/00; F01N 3/0857; F01N 2570/10; F01N 2410/12; B01D 53/0462;
(Continued)

(56) References Cited

U.S. PATENT DOCUMENTS 3,658,043 A    4/1972 Hoffman
3,828,552 A    8/1974 Nishiguchi
(Continued)

FOREIGN PATENT DOCUMENTS

CN    201196111 Y    2/2009
DE    3437750 A1    5/1986
(Continued)

OTHER PUBLICATIONS

Machine Translation of Saito et al. (JP 2006-298707), Nov. 2, 2006.*
(Continued)

*Primary Examiner* — Thomas Denion
*Assistant Examiner* — Mickey France
(74) *Attorney, Agent, or Firm* — Abelman, Frayne & Schwab

(57) ABSTRACT

A method and system for on-board treatment of an exhaust stream containing $CO_2$ emitted by an internal combustion engine in order to reduce the amount of $CO_2$ discharged into the atmosphere which include:
  a. a treatment zone, preferably operating in swing mode with at least two subsystems, on board the vehicle containing a capture agent having a predetermined capacity for extracting $CO_2$ from the exhaust stream, each subsystem having a heat exchanger with an inlet for admitting the hot exhaust gas stream for passage in heat relation with the capture agent to release $CO_2$ and regenerate the capture agent, an outlet for passage of a treated, cooled exhaust stream having a reduced $CO_2$ content, and an outlet for $CO_2$ released from the regenerated capture agent;

(Continued)

b. a compression zone for reducing the volume of the $CO_2$; and c. a storage zone for the temporary storage of compressed $CO_2$.

20 Claims, 18 Drawing Sheets

(51) Int. Cl.
*B01D 53/62* (2006.01)
*B01D 53/92* (2006.01)

(52) U.S. Cl.
CPC .. *B01D 2251/304* (2013.01); *B01D 2251/402* (2013.01); *B01D 2257/504* (2013.01); *B01D 2259/65* (2013.01); *Y02C 10/04* (2013.01); *Y02C 10/08* (2013.01); *Y02P 20/129* (2015.11)

(58) Field of Classification Search
CPC ...... B01D 53/047–53/053; B01D 2259/40007; B01D 2259/40081; B01D 53/62; B01D 53/92; B01D 2251/304; B01D 2251/402; B01D 2257/504; B01D 2259/65; B01D 2259/4009; Y02C 10/08; Y02C 10/04; Y02C 10/06
USPC .......... 60/272–274, 279, 281, 286–288, 295, 60/303, 309, 311, 320
See application file for complete search history.

(56) References Cited

U.S. PATENT DOCUMENTS

| | | | |
|---|---|---|---|
| 3,909,206 A | 9/1975 | Katz | |
| 3,913,326 A | 10/1975 | Banks | |
| 3,932,987 A | 1/1976 | Munzinger | |
| 4,055,955 A | 11/1977 | Johnson | |
| 4,290,268 A | 9/1981 | Lowther | |
| 4,341,088 A | 7/1982 | Mei et al. | |
| 4,442,673 A * | 4/1984 | Haworth | F01K 23/14 60/307 |
| 4,566,278 A * | 1/1986 | Force | B01D 53/1475 123/3 |
| 4,674,463 A | 6/1987 | Duckworth et al. | |
| 4,729,879 A | 3/1988 | Black | |
| 4,786,294 A | 11/1988 | Jonqueres et al. | |
| 4,810,266 A | 3/1989 | Zinnen | |
| 4,832,711 A * | 5/1989 | Christel, Jr. | B01D 53/0454 95/105 |
| 4,891,939 A | 1/1990 | Brighenti | |
| 4,899,544 A | 2/1990 | Boyd | |
| 5,076,055 A | 12/1991 | Jubb | |
| 5,100,635 A | 3/1992 | Krishnamurthy et al. | |
| 5,141,620 A | 8/1992 | Molter | |
| 5,233,837 A | 8/1993 | Callahan | |
| 5,272,891 A | 12/1993 | Erickson | |
| 5,281,254 A | 1/1994 | Birbara et al. | |
| 5,442,914 A | 8/1995 | Otsuka | |
| 5,467,722 A | 11/1995 | Meratla | |
| 5,515,691 A | 5/1996 | Wertenbach et al. | |
| 5,520,894 A * | 5/1996 | Heesink | B01D 53/12 423/220 |
| 5,667,561 A | 9/1997 | Suzuki et al. | |
| 5,680,764 A | 10/1997 | Viteri | |
| 5,743,080 A | 4/1998 | Ginter | |
| 5,857,324 A | 1/1999 | Scappatura et al. | |
| 5,876,488 A | 3/1999 | Birbara et al. | |
| 6,079,373 A | 6/2000 | Kawamura | |
| 6,218,173 B1 | 4/2001 | Naito | |
| 6,220,019 B1 | 4/2001 | Sugiura et al. | |
| 6,263,659 B1 | 7/2001 | Dillon et al. | |
| 6,301,927 B1 | 10/2001 | Reddy | |
| 6,352,576 B1 | 3/2002 | Spencer et al. | |
| 6,374,630 B1 | 4/2002 | Jones | |
| 6,387,337 B1 | 5/2002 | Pennline et al. | |
| 6,387,845 B1 * | 5/2002 | Masahiro | B01D 53/62 423/230 |
| 6,582,498 B1 | 6/2003 | Sass et al. | |
| 6,591,614 B2 | 7/2003 | Smith et al. | |
| 6,598,398 B2 | 7/2003 | Viteri et al. | |
| 6,625,977 B2 | 9/2003 | Lehman | |
| 6,655,150 B1 | 12/2003 | Åsen | |
| 6,675,609 B2 | 1/2004 | Takeuchi et al. | |
| 6,712,879 B2 | 3/2004 | Kato et al. | |
| 6,764,530 B2 | 7/2004 | Iijima | |
| 6,866,702 B2 | 3/2005 | Mitsuda | |
| 6,889,512 B2 | 5/2005 | Ebara et al. | |
| 6,890,497 B2 | 5/2005 | Rau et al. | |
| 6,912,872 B2 | 7/2005 | Whitlock | |
| 6,925,821 B2 | 8/2005 | Sienel | |
| 7,055,333 B2 | 6/2006 | Leitch et al. | |
| 7,065,962 B2 | 6/2006 | Boncodin | |
| 7,067,456 B2 | 6/2006 | Fan et al. | |
| 7,073,348 B2 | 7/2006 | Clodic et al. | |
| 7,089,743 B2 | 8/2006 | Frutschi et al. | |
| 7,207,170 B2 | 4/2007 | Fukuma | |
| 7,250,150 B1 | 7/2007 | Keefer et al. | |
| 7,275,395 B1 | 10/2007 | Ventura | |
| 7,290,504 B2 | 11/2007 | Lange | |
| 7,326,280 B2 | 2/2008 | Hrycak et al. | |
| 7,390,444 B2 | 6/2008 | Ramme et al. | |
| 7,444,812 B2 | 11/2008 | Kirkpatrick et al. | |
| 7,618,606 B2 | 11/2009 | Fan et al. | |
| 7,621,980 B2 | 11/2009 | Saito et al. | |
| 2002/0002822 A1 * | 1/2002 | Sasaki | F01N 3/023 60/280 |
| 2002/0170436 A1 * | 11/2002 | Keefer | B01J 20/183 96/121 |
| 2003/0053942 A1 | 3/2003 | Fernandez | |
| 2003/0221414 A1 * | 12/2003 | Kim | F01N 3/0892 60/275 |
| 2004/0074235 A1 | 4/2004 | Lampkin et al. | |
| 2004/0128975 A1 | 7/2004 | Viteri | |
| 2004/0265199 A1 * | 12/2004 | MacKnight | B01D 53/0454 423/220 |
| 2005/0115230 A1 | 6/2005 | Shi | |
| 2005/0123462 A1 * | 6/2005 | Hansen | B01D 53/02 423/220 |
| 2005/0172631 A1 | 8/2005 | Primlani | |
| 2005/0193962 A1 | 9/2005 | Mariscal Munoz | |
| 2006/0039853 A1 | 2/2006 | Fan et al. | |
| 2006/0063046 A1 * | 3/2006 | Hu | B60L 11/1881 429/414 |
| 2006/0148642 A1 * | 7/2006 | Ryu | B01D 53/12 502/84 |
| 2006/0150665 A1 | 7/2006 | Weimer et al. | |
| 2006/0204425 A1 | 9/2006 | Kamijo et al. | |
| 2007/0072769 A1 * | 3/2007 | Imada | B01D 53/0423 502/411 |
| 2007/0125229 A1 * | 6/2007 | Saito | B01D 53/02 95/139 |
| 2007/0149398 A1 | 6/2007 | Jones et al. | |
| 2007/0193254 A1 | 8/2007 | Johannes | |
| 2007/0243127 A1 | 10/2007 | Fedorov et al. | |
| 2008/0056972 A1 | 3/2008 | Iijima | |
| 2008/0112868 A1 | 5/2008 | Blencoe et al. | |
| 2008/0127632 A1 | 6/2008 | Finkenrath et al. | |
| 2008/0134660 A1 | 6/2008 | Finkenrath et al. | |
| 2008/0202339 A1 | 8/2008 | Nalette et al. | |
| 2008/0236117 A1 | 10/2008 | Zhang et al. | |
| 2008/0282888 A1 * | 11/2008 | Deckman | B01D 53/02 95/126 |
| 2008/0302104 A1 | 12/2008 | Hwang | |
| 2009/0038316 A1 * | 2/2009 | Pearson | C07C 1/24 60/784 |
| 2009/0038561 A1 | 2/2009 | Hago et al. | |
| 2009/0169452 A1 | 7/2009 | Constantz et al. | |
| 2009/0173073 A1 | 7/2009 | Guidati et al. | |
| 2009/0178387 A1 | 7/2009 | Schultz et al. | |
| 2009/0183697 A1 | 7/2009 | Inui | |
| 2009/0263296 A1 | 10/2009 | Taques | |

(56) References Cited

U.S. PATENT DOCUMENTS

| | | |
|---|---|---|
| 2009/0263316 A1 | 10/2009 | Iyer et al. |
| 2009/0275120 A1 | 11/2009 | Koch et al. |
| 2009/0282389 A1 | 11/2009 | Slone et al. |
| 2009/0305388 A1 | 12/2009 | Dressler et al. |
| 2009/0305870 A1* | 12/2009 | Chung ............... B01D 53/1425 502/56 |
| 2009/0313997 A1 | 12/2009 | Bayley et al. |
| 2009/0315489 A1 | 12/2009 | Karim et al. |
| 2010/0024651 A1 | 2/2010 | Bansal |
| 2010/0071559 A1 | 3/2010 | Miachon et al. |
| 2010/0158776 A1 | 6/2010 | Drnevich et al. |
| 2010/0162703 A1* | 7/2010 | Li ..................... B01D 53/1425 60/670 |
| 2010/0172810 A1 | 7/2010 | Yi et al. |
| 2011/0088549 A1* | 4/2011 | Sayari .................... B01D 53/02 95/96 |
| 2011/0167798 A1 | 7/2011 | Evans-Beauchamp |
| 2012/0164045 A1* | 6/2012 | Peiffer .................. B01D 53/02 423/228 |

FOREIGN PATENT DOCUMENTS

| | | | |
|---|---|---|---|
| DE | 4140573 A1 | 6/1993 | |
| EP | 1992799 A2 | 11/2008 | |
| FR | 2875265 A1 | 3/2006 | |
| GB | 1109128 A * | 4/1968 | ............ B01D 46/30 |
| JP | 04118021 A * | 1/1992 | |
| JP | 2006298707 A | 11/2006 | |
| WO | 03/029625 A1 | 4/2003 | |

OTHER PUBLICATIONS

Dubey et al., "Extraction of Carbon Dioxide From the Atmosphere Through Engineered Chemical Sinkage", Fuel Chem. Div. Preprints, 2002, 47(1), pp. 81-84.

International Search Report & Written Opinion mailed on May 21, 2012 in PCT/US2012/022008 filed Jan. 20, 2012.

Supplementary European Search Report & Opinion mailed Oct. 31, 2014 in EP 12736166 filed Jan. 21, 2012.

Office Action mailed Jul. 9, 2014 in U.S. Appl. No. 13/980,620, filed Aug. 29, 2013.

International Search Report & Written Opinion mailed May 25, 2012 in PCT/US2012/022058 filed Jan. 20, 2012.

Supplementary European Search Report & Opinion mailed Oct. 21, 2014 in EP12736182 filed Jan. 20, 2012.

Office Action mailed Nov. 26, 2014 in U.S. Appl. No. 13/980,453, filed Jul. 18, 2013.

International Search Report & Written Opinion mailed May 10, 2012 in PCT/US2012/022034 filed Jan. 20, 2012.

Supplementary European Search Report & Opinion mailed Jul. 23, 2014 in EP 12736347 filed Jan. 20, 2012.

Office Action mailed Oct. 3, 2014 in U.S. Appl. No. 13/980,596, filed Aug. 29, 2013.

International Search Report & Written Opinion mailed May 8, 2012 in PCT/US2012/022021 filed Jan. 20, 2012.

* cited by examiner

System Startup and Shutdown

Desorption Control Strategy

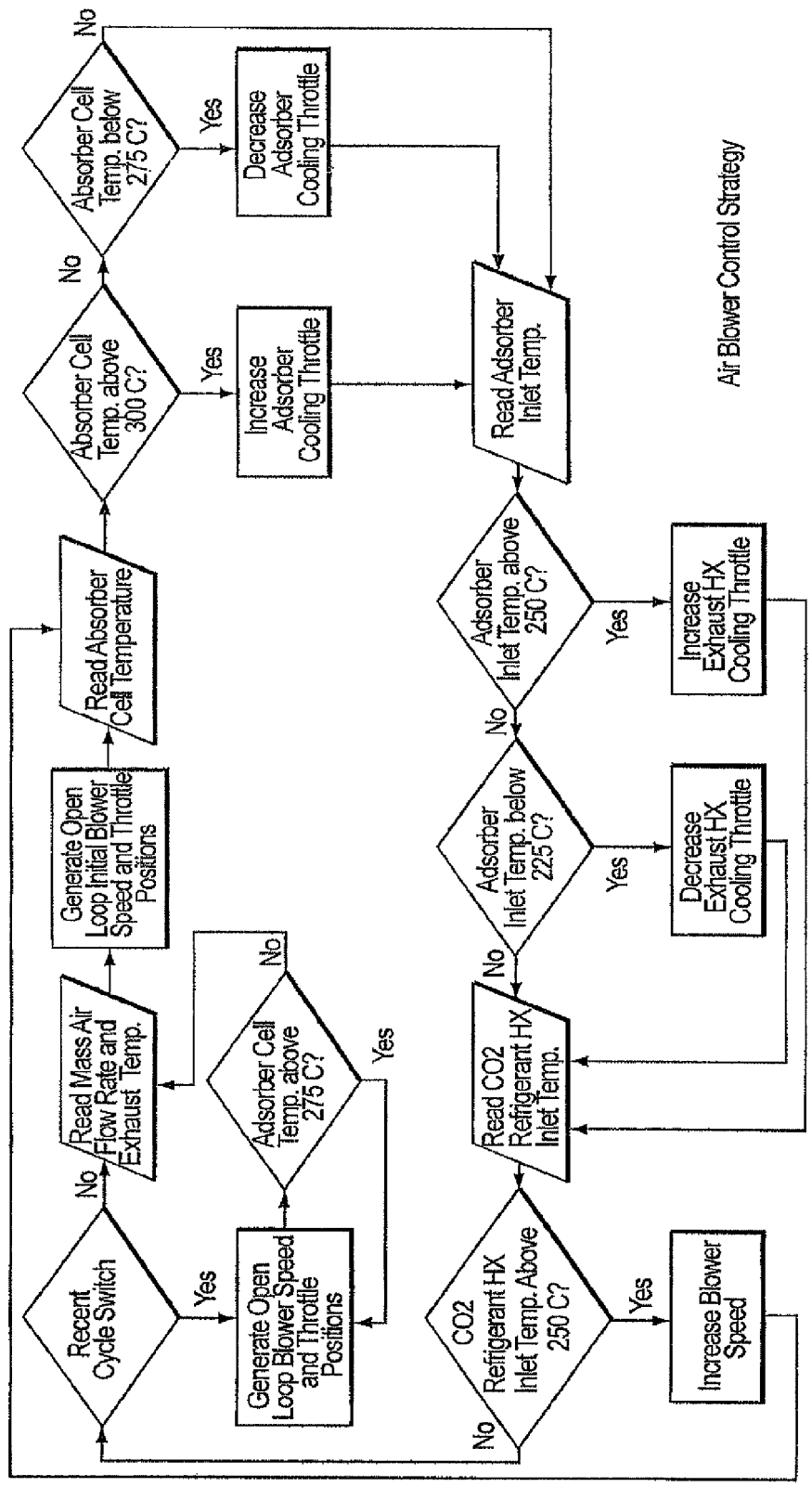

REVERSIBLE SOLID ADSORPTION METHOD AND SYSTEM UTILIZING WASTE HEAT FOR ON-BOARD RECOVERY AND STORAGE OF $CO_2$ FROM MOTOR VEHICLE INTERNAL COMBUSTION ENGINE EXHAUST GASES

FIELD OF THE INVENTION

The invention relates to the reduction of carbon dioxide emissions from the exhaust gas stream of vehicles powered by internal combustion engines and other heat engines that produce waste heat.

BACKGROUND OF THE INVENTION

The currently accepted thinking is that global warming is due to emissions of greenhouse gases such as carbon dioxide ($CO_2$) and methane ($CH_4$). About a quarter of global human-originated $CO_2$ emissions are currently estimated to come from mobile sources, i.e., automobiles, trucks, buses and trains that are powered by an internal combustion engine (ICE). This proportional contribution is likely to grow rapidly in the foreseeable future with the projected surge in automobile and truck ownership in developing countries. At present, the transportation sector is a major market for crude oil, and controlling $CO_2$ emissions is both an environmental responsibility and a desirable goal in order to maintain the viability of the crude oil market in the transportation sector in the face of challenges from alternative technologies, e.g., cars powered by electric motors and storage batteries.

Carbon dioxide management from mobile sources has many challenges including space and weight limitations, the lack of any economies of scale and the dynamic nature of the operation of the ICE powering the mobile sources.

Prior art methods for the capture of $CO_2$ from combustion gases have principally focused on stationary sources, such as power plants. Those that address the problem of reducing $CO_2$ emissions from mobile sources employ either combustion using oxygen, provide no means for the regeneration and reuse of the $CO_2$ capture agent, and/or make no use of waste heat recovered from the hot source. Combustion using oxygen requires oxygen-nitrogen separation which is more energy-intensive than separating $CO_2$ from the exhaust gases and would be more difficult if attempted on board the vehicle.

The focus of $CO_2$ capture technology being on stationary, or fixed sources, the capture of $CO_2$ from mobile sources has generally been considered too expensive, since it involves a distributed system with a reverse economy of scale. The solution to the problem has appeared to be impractical due to on-board vehicle space limitations, the additional energy and apparatus requirements and the dynamic nature of the vehicle's operating cycle, e.g., intermittent periods of rapid acceleration and deceleration.

It is therefore an object of the present invention to provide a method, system and apparatus that addresses the problems of efficiently and cost-effectively reducing the $CO_2$ emissions from vehicles by temporary on-board storage of the $CO_2$. The capability for mass production of such systems will at least partially off-set other costs associated with the distributed nature of these mobile sources.

As used herein, the term internal combustion engine, or ICE, includes heat engines in which a carbon-containing fuel is burned to produce power or work and generates waste heat that must be removed or dissipated.

As used herein, the term "mobile source" means any of the wide variety of known conveyances that can be used to transport goods and/or people that are powered by one or more internal combustion engines that produce an exhaust gas stream containing $CO_2$. This includes all types of motor vehicles that travel on land, airplanes and ships where the exhaust from the ICE is discharged into a containing conduit before it is discharged into the atmosphere.

The term "vehicle" as used herein is to be understood to be as a convenient shorthand and synonymous with "mobile source" and is coexistensive with "conveyances", generally, as that term is used above.

As used herein the terms, "$CO_2$ capture agent" and "capture agent" means a solid adsorbent material or composition that reversibly extracts and retains $CO_2$ extracted from the ICE's exhaust gas stream. Also included are solid materials that have been coated and/or impregnated with a liquid absorbent composition. The term can also mean a reagent that reacts reversibly with the $CO_2$ to form a new compound.

As used herein, the term "waste heat" is the heat that a typical engine produces which is contained mainly in the hot exhaust gases (~300°-650° C.) and the hot coolant (~90°-120° C.). Additional heat is emitted and lost by convection and radiation from the engine block and its associated components, and other components through which the exhaust gas passes, including the manifold, pipes, catalytic converter and muffler. This heat energy totals about 60% of the energy that typical hydrocarbon (HC) fuels provide.

SUMMARY OF THE INVENTION

The invention broadly comprehends a method and system for on-board treatment of an exhaust stream containing $CO_2$ emitted by a hydrocarbon-fueled internal combustion engine (ICE) used to power the vehicle in order to reduce the amount of $CO_2$ discharged into the atmosphere, the system comprising:

a. a treatment zone on board the vehicle containing a capture agent having a predetermined capacity for extracting $CO_2$ from the exhaust stream,
   the treatment zone having an inlet for admitting the exhaust gas stream and an outlet for passage of a treated exhaust stream having a reduced $CO_2$ content,
   the treatment zone further including a heat exchanger with an inlet for receiving a hot heat exchange fluid, e.g., the hot exhaust gas stream from the ICE for passage in heat exchange relation with the capture agent to release $CO_2$ and regenerate the capture agent, and an outlet for the cooled heat exchange fluid, e.g., the exhaust gas stream,
   the treatment zone having a $CO_2$ discharge outlet for $CO_2$ released from the regenerated capture agent;
b. a compression zone in fluid communication with the $CO_2$ discharge outlet from the treatment zone, the compression zone including one or more compressors for reducing the volume of the $CO_2$;
c. a storage zone for receiving the compressed $CO_2$ for temporary storage on board the vehicle; and
d. an exhaust gas conduit in fluid communication with the treated exhaust gas stream outlet from the treatment zone.

The present invention solves the problems of space limitations and auxiliary power requirements by using the free energy that is available on board the vehicle as waste heat to capture $CO_2$ and increase its density for temporary storage until refueling. The invention consists of (a) an adsorption separation method that utilizes a capture agent to remove all or a substantial portion of the $CO_2$ from the engine exhaust gases; (b) a recovery of substantially pure $CO_2$ and regeneration of the capture agent using some of the engine waste heat; (c) conversion of some of the engine's waste heat into power, i.e., work energy; and (d) the use of this power to increase the density of the captured $CO_2$ for temporary on-board storage. The use of the waste heat to provide the energy for capture, regeneration and densification significantly reduces the capture cost and the densification will reduce the volume requirement for temporary on-board storage of the $CO_2$.

The invention further comprehends the optional use of some portion of the engine's work to operate a $CO_2$ compressor. The engine's work could be utilized when the engine is operating in the deceleration mode and would serve to slow the engine, and when the engine is idling. An on-board processor and controller can be utilized to engage the compressor drive link to the engine at appropriate predetermined engine operating conditions.

The invention can be used on a wide range of mobile sources such as passenger vehicles, trucks, buses, heavy-duty vehicles, train, ships and the like that operate through the combustion of fossil-based, or hydrocarbon fuels. The system and apparatus of the invention can be installed on new mobile sources and/or by retrofitting existing mobile sources.

The present invention is based on the integration of various components to form a system for efficient post-combustion $CO_2$ capture, densification and subsequent temporary storage on board the conveyance using waste heat recovered from the vehicle's ICE. The system can include (a) an adsorption/separation zone for the capture of $CO_2$ from the engine exhaust gas; (b) a regeneration zone for the release of $CO_2$ from the capture agent that uses some of the engine waste heat; (c) a conversion zone where some of the waste heat is converted into power (work energy); and (d) a densification zone where power derived from the waste heat is employed to increase the density of the captured $CO_2$ for temporary on-board storage. In the practice of the method of the invention, all or a substantial portion of the energy requirements to operate the system come from the engine waste heat.

The waste heat that a typical engine produces consists mainly of hot exhaust gases at a temperature in the range of ~300° to 650° C. and hot coolant at a temperature of ~90° to 120° C. As shown in the diagram of FIG. 1, this heat energy totals about 60% of the energy that typical hydrocarbon (HC) fuels produce upon combustion in an ICE. Energy is needed to separate the $CO_2$ from the exhaust gases and to compress, liquefy or freeze all or part of the captured $CO_2$ for efficient on-board storage. This energy is usually a mix of work and heat energies. The work component of the energy is generated by using part of the waste heat to produce this work. Some waste heat can be used to regenerate any material used in the $CO_2$ separation such as adsorbent or a solid carbonate that is formed as a reaction product.

The $CO_2$ separation from the exhaust gas takes place by one or more of the reversible processes of physical adsorption, chemical adsorption, and/or a chemical reaction to form carbonates or other compounds. These mechanisms are well known in the field, and some are shown schematically in FIGS. 2 and 3. As illustrated in FIG. 2, about 60% of the energy value of the fuel is converted to waste heat, portions of which can be used to desorb the $CO_2$ and regenerate the capture agent and to generate electrical energy and other forms of power, or work required to compress the $CO_2$. FIG. 3 illustrates one example of the use of the heat of the exhaust gas to desorb the $CO_2$ and regenerate the capture agent. Water is also removed as condensate from the cooled exhaust gases and the exhaust gases of reduced $CO_2$ content are discharged into the atmosphere.

The specific use in the limited space that can be made available on board mobile sources requires close analysis of many parameters. Regeneration of the capture agent will preferably take place on board by a temperature swing or pressure swing process. However, in the event that the capture agent possesses a very high capacity that serves both to capture and to densifiy the $CO_2$, the regeneration can be completed during refueling or at a fixed station. In the later case, the regeneration temperature requirements, and/or heat transfer conditions cannot be practically attained on board the vehicle. The adsorbent material can be maintained in a cartridge or other removable container that can be removed for regeneration at an appropriate facility. Multiple cartridges can be installed in parallel for extended vehicle operation.

The regeneration and densification steps can also proceed simultaneously. If a capture agent is heated, it will begin releasing $CO_2$. If $CO_2$ is not removed or given room to expand, then high pressure and high temperature $CO_2$ will accumulate. In this case, the regeneration of the capture agent will not be as complete as when $CO_2$ released is removed.

In accordance with the processes of the prior art, the swing operation between the adsorption and desorption beds or cells is based on the monitoring of the composition of the effluent. Breakthrough of a predetermined concentration of $CO_2$ from the sorbent bed indicates the complete or near saturation of the sorbent material. Similarly, a decreased or minimal $CO_2$ concentration in the flow from the desorption bed indicates completion of the regeneration of the sorbent material.

In accordance with the present invention, new criteria have been developed for determining when to terminate the flow of the exhaust gas stream to the sorbent and to begin the associated desorption step. The new criteria are based on the temperature profile and pressure in the adsorption and desorption cells. An increase in the temperature of the sorbent in the adsorption cell indicates continued adsorption, while an increase of pressure in the desorption cell indicates continued regeneration of $CO_2$. This process control strategy is novel in that it relies on temperature and pressure indicators to switch between adsorption and desorption cells, rather than $CO_2$ concentration measurements.

The determination of the temperature and pressure profiles for a specific system can be based on empirical data obtained during testing over the useful cycle life of the sorbent. Swing points can be based on one or the other of temperature or pressure, or both. The swing point can also be based on rate of change of either or both of temperature and pressure. Such determinations are within the skill of the art and can be based upon data from sensors positioned in the cells and in contact with the sorbent material.

In a preferred embodiment, the $CO_2$ released from the capture agent in a tube-and-shell unit will create a positive pressure and the intake of the compressor will produce a down-stream low pressure zone, thereby resulting in the flow of the desorbed $CO_2$ gas stream for compression. When a predetermined amount of the $CO_2$ has been desorbed, the adsorption unit can be returned to service, and receive the engine exhaust stream.

The formation of dense $CO_2$ for efficient on-board temporary storage is accomplished by compression, liquefaction or by freezing the gas to form solid $CO_2$, or dry ice. The final density of the $CO_2$ will be in the range of from 5-1600 kg/m3, depending upon its state, i.e.; gas, liquid and/or solid. At least a part of the total work energy required for the densification is obtained from the waste heat by using heat-to-power conversion.

During start-up of the $CO_2$ capture cycle, or to meet a requirement of other special operational needs, part of the engine's power or, alternatively, the electricity stored in on-board batteries can be used. During the normal steady-state operation of the system, at least a portion of the energy required for $CO_2$ capture and densification will come from the ICE's waste heat.

One advantage possessed by the present invention over prior art processes for reducing $CO_2$ emissions from fixed sources is the ready availability of relatively high to moderate temperature waste heat. The cost of the heat energy is a major item of expense for $CO_2$ capture from fixed sources because the temperature of the flue gases from a coal- or gas-fired electrical generation facility has been reduced in order to maximize the energy values of the fuel and minimize the discharge of waste heat into the environment.

BRIEF DESCRIPTION OF THE DRAWINGS

The invention will be further described below and with reference to the attached drawings in which the same or similar elements are identified by the same number, and in which:

FIG. 14 is a process flow diagram for an embodiment of a stepwise protocol for the blower control in a system of the present invention as depicted in FIGS. 8-12.

DETAILED DESCRIPTION OF THE INVENTION

The invention will be described with reference to embodiments in which $CO_2$ gas is extracted from the engine's exhaust gas until the capacity of the capture agent is reached and then the $CO_2$ is recovered from the capture agent, which is simultaneously regenerated. The $CO_2$ that is recovered as a gas stream is then compressed for storage as a gas, liquid and/or solid. Some or all of the energy required for some or all of the steps is derived from heat recovered from the engine exhaust stream, which can be used directly for regeneration of the capture agent and/or converted to electricity or work by other conventional devices.

Figure 4:
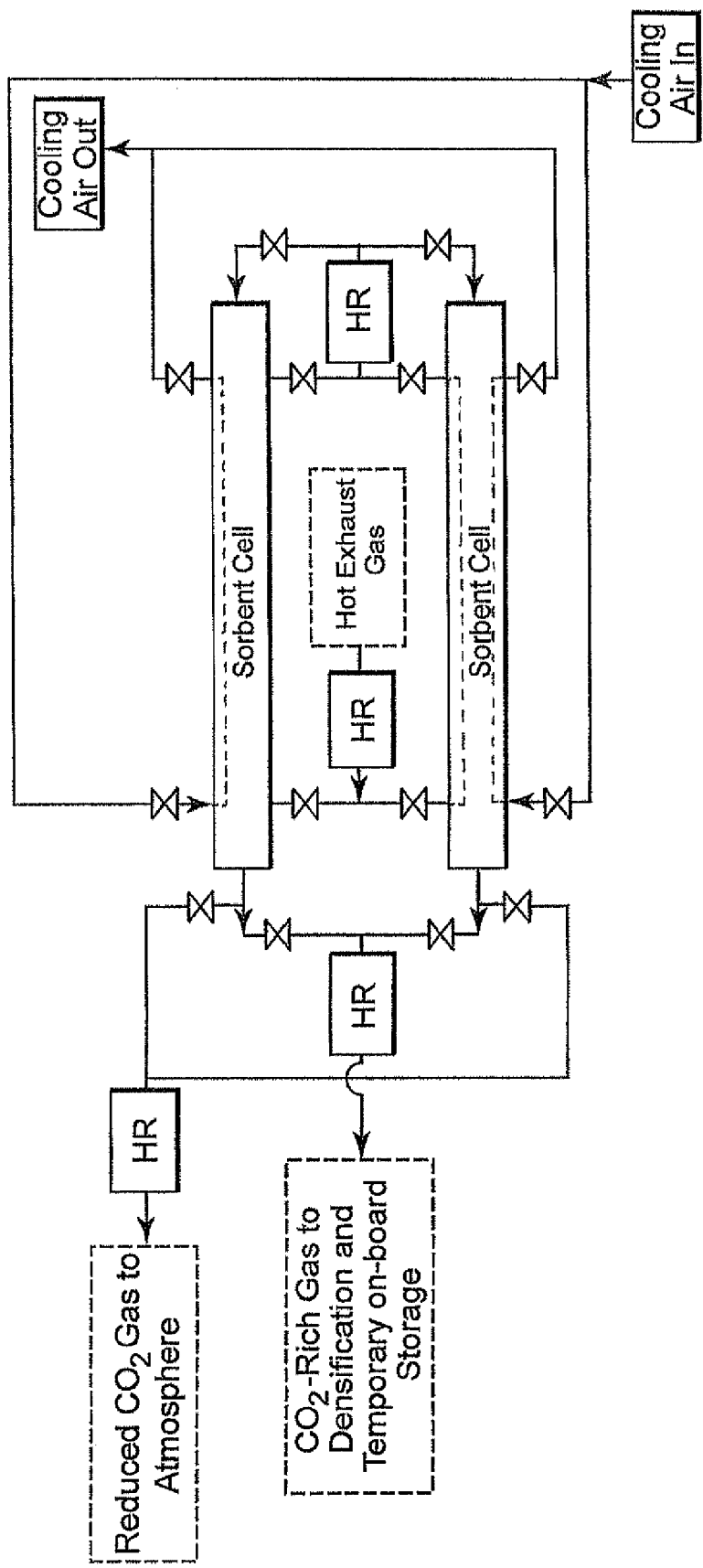
FIG. 4 is a schematic illustration of one embodiment of a system and apparatus with two parallel $CO_2$ capture/regeneration subsystems and representative heat recovery devices.

In one embodiment of this invention schematically illustrated in FIG. 4, a suitable system and apparatus is shown in which $CO_2$ can be adsorbed from the exhaust stream after the exhaust passes through a heat recovery device. The broken lines within the respective cells indicate the flow paths of fluid in the conduits to which they are connected. The method of operation and gas flow paths are illustrated in subsequent figures. The system is illustratively shown with two subsystems, or cells; however, additional subsystems can be used based on the capacity of the capture agent, exhaust gas flow rates and other characteristics of the system. Each subsystem can be similar in design to a tube-and-shell heat exchanger where the capture agent is placed as a fixed bed in each of the plurality of tubes. The capture agent can also be placed in the shell side of the cell in which case the heating and cooling gases are passed through the tubes.

Figure 4A:
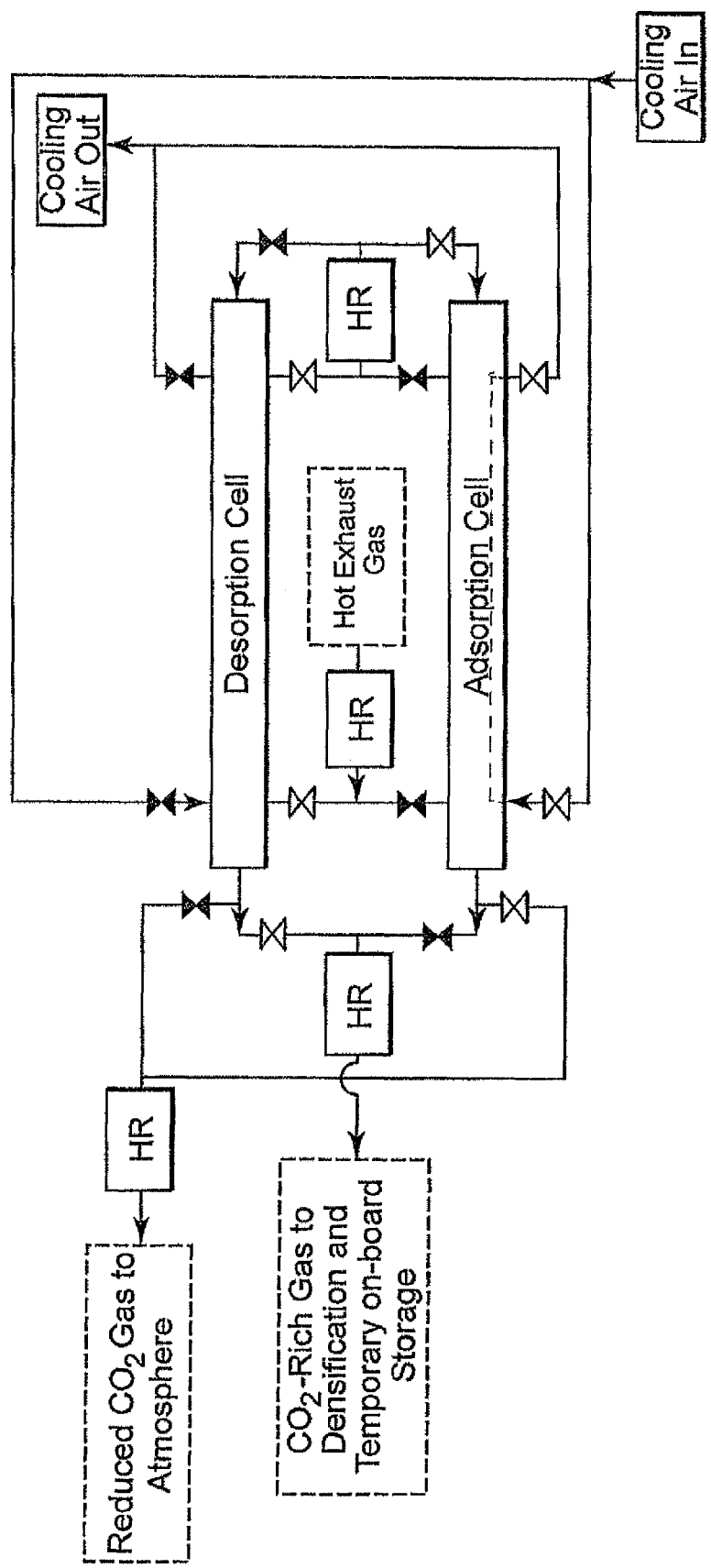
FIG. 4A is a schematic illustration of the system of FIG. 4 at the stage in the operating cycle in which one of the $CO_2$ capture subsystems is being regenerated and the other is extracting $CO_2$ from the cooled exhaust gas stream.
Figure 4B:
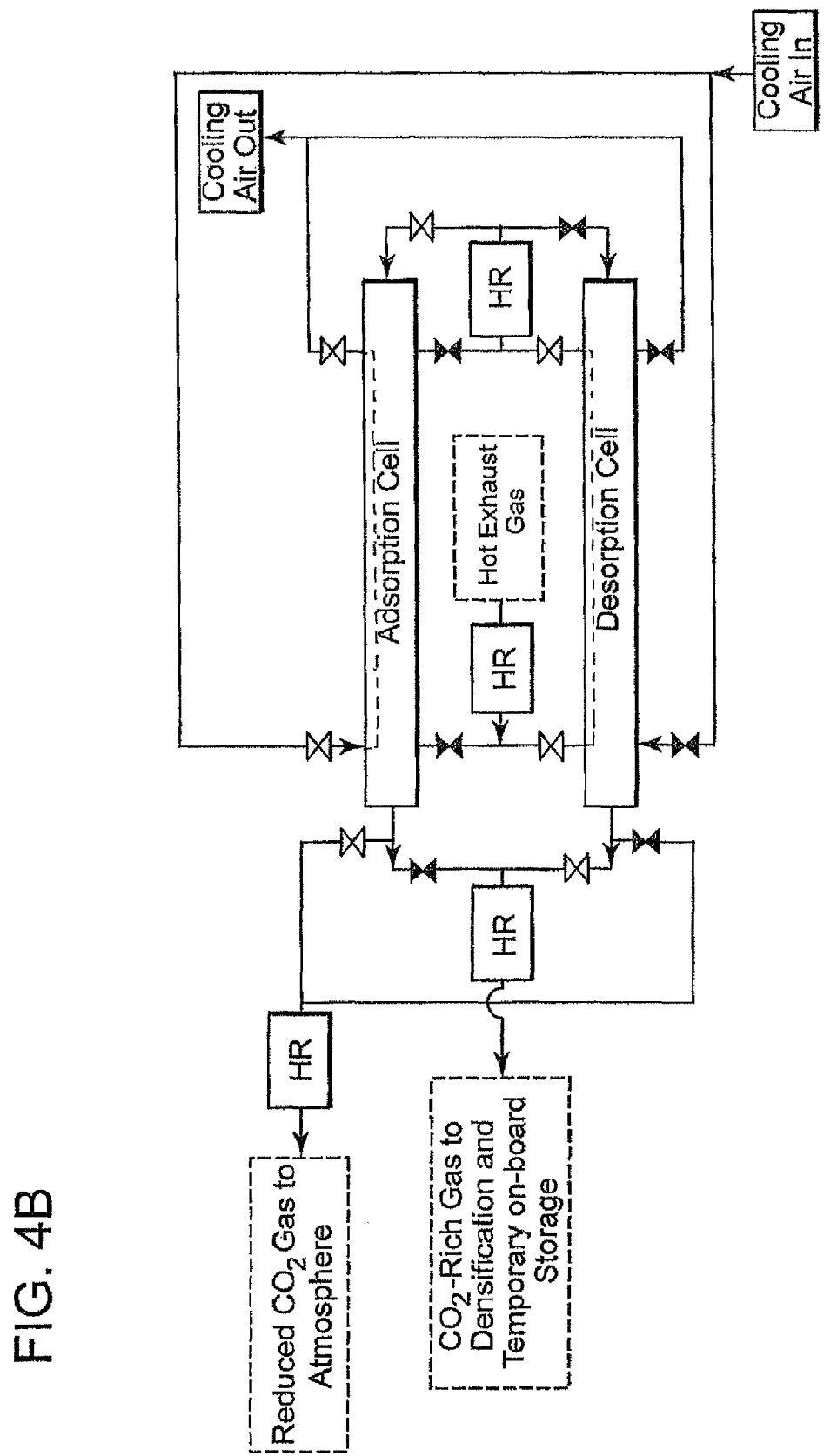
FIG. 4B is a schematic illustration similar to FIG. 4A in which the functions of the subsystems are reversed.

FIGS. 4A and 4B demonstrate the method of swing operation between the two cells, where the $CO_2$ is captured in one cell (the adsorption cell) while the regeneration of spent capture agent, e.g., the solid adsorbent material, occurs in the other cell (the desorption cell). The clear valves indicate an open position and the darkened valves indicate a closed or no-flow position in this series of figures.

In the embodiments of FIGS. 4A and 4B, the hot exhaust gas passes through the shell side of the desorption cell, where the waste heat is used to supply the heat of desorption to the capture agent, which will release the $CO_2$ and regenerate the capture agent. The hot exhaust gases lose heat and decrease in temperature after passing through shell side of the desorption cell.

The exhaust gas enters the tube side of the adsorption cell where the $CO_2$ is adsorbed physically and/or chemically on the capture agent. The exhaust gases exit the adsorption cell low in $CO_2$. As the $CO_2$ is adsorbed on the capture agent it releases the heat of adsorption. Removal of the heat can be accomplished by passing air through the shell side. When the capture agent reaches maximum capacity, the exhaust gas and cooling air swing between the capture cells, as shown in FIGS. 4A and 4B. The swing process between the adsorption and desorption cells can be triggered by monitoring the $CO_2$ concentration in the exhaust gas or it can occur after a predetermined optimum operational time based on operating experience.

The $CO_2$-lean gas is released to the atmosphere. The $CO_2$-rich gas is passed to the densification zone where it is pressurized, liquefied or solidified for temporary on-board storage. The stored $CO_2$ can be recovered when the vehicle is refueled, or at a specialized recovery facility.

This embodiment can be used for physical or chemical adsorption. Physical adsorbents are presently preferred because the heat of adsorption is generally relatively lower for these materials as compared to chemical adsorbents. In general, chemical adsorbents have the advantage of high loading capacity of $CO_2$ on the solid material, thereby resulting in smaller sorbent cells for a comparable volume of $CO_2$.

Figure 7:
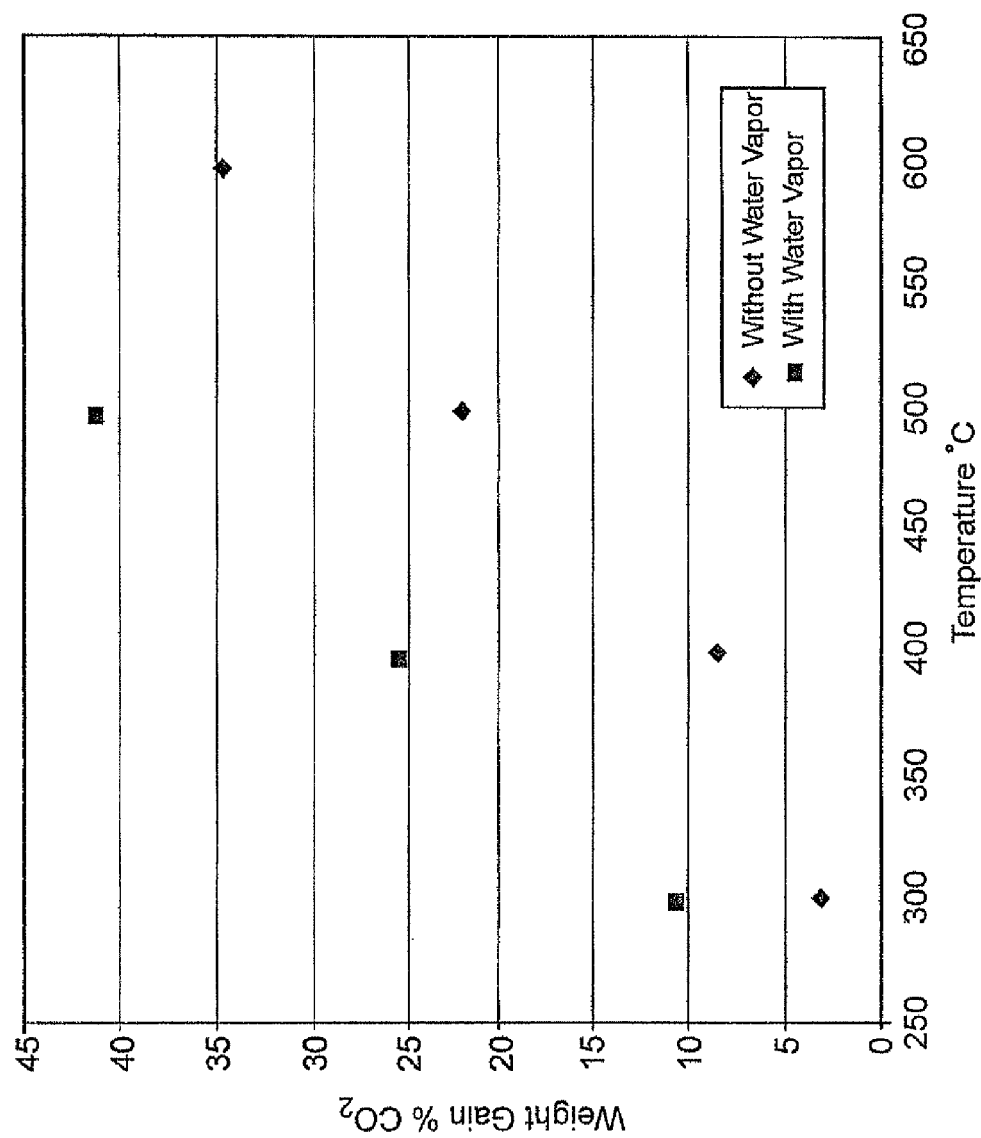
FIG. 7 is a chart illustrating the increase in the $CO_2$ adsorption capacity of solid aluminate adsorbent compound with temperature for a $CO_2$ gas stream with and without water vapor.

The exhaust gas stream from a gasoline or diesel fueled ICE contains about 13% water vapor. The presence of water vapor can have a positive, a negative, or no effect on the ability of particular sorbent materials to remove $CO_2$ from the exhaust stream. For example, as illustrated graphically in FIG. 7, the presence of water vapor increases the weight gain of $CO_2$ as a percentage of the solid sorbent material at relatively lower temperatures. At a temperature of 500° C. and in the absence of water, the weight gain for the sorbent is about 22%, while in the presence of water vapor the gain almost doubles to about 42%. The relative weight gain at 300° C. and 400° C. is about triple for $CO_2$ in the presence of water vapor. In the case of those adsorbents for which the presence of water vapor enhances the $CO_2$ adsorption capacity of the material, less sorbent material can be used for a given capacity of $CO_2$. Sorbents that benefit from the presence of water in the exhaust stream include aluminate-based and amine-based materials such as calcium aluminate, poly(allylamine), and high boiling point liquid amines supported on porous solids.

Adsorbent materials which are adversely effected by water vapor can be utilized in the practice of the invention if the material has an initial high capacity for $CO_2$ retention that exceeds that of compounds falling into the first two categories.

In any event, substantially all of the water vapor will be discharged to the atmosphere with the nitrogen and any remaining $CO_2$.

Figure 5:
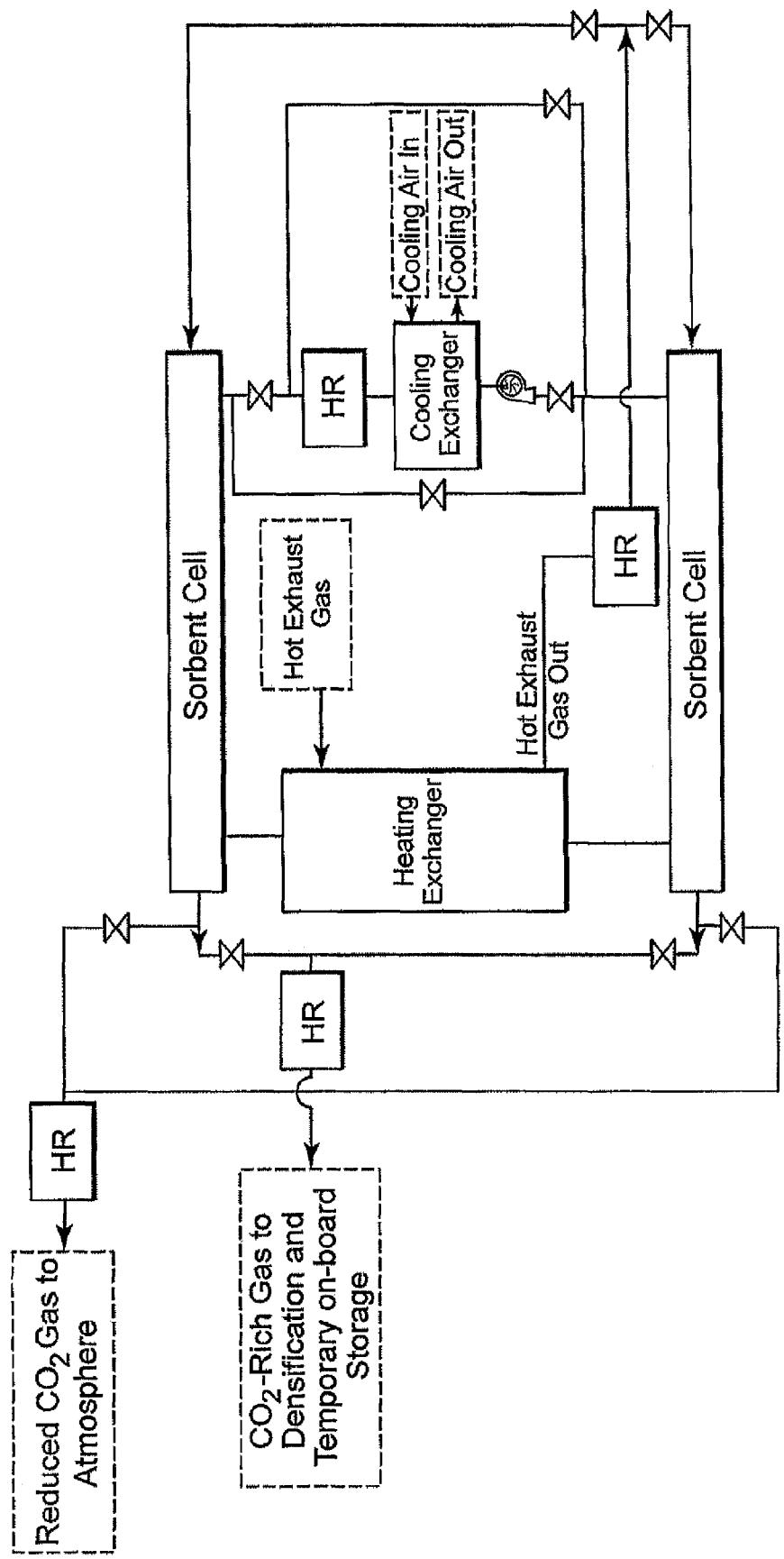
FIG. 5 is a schematic illustration of another embodiment of a system with two parallel subsystems and representative heat recovery devices.
Figure 5A:
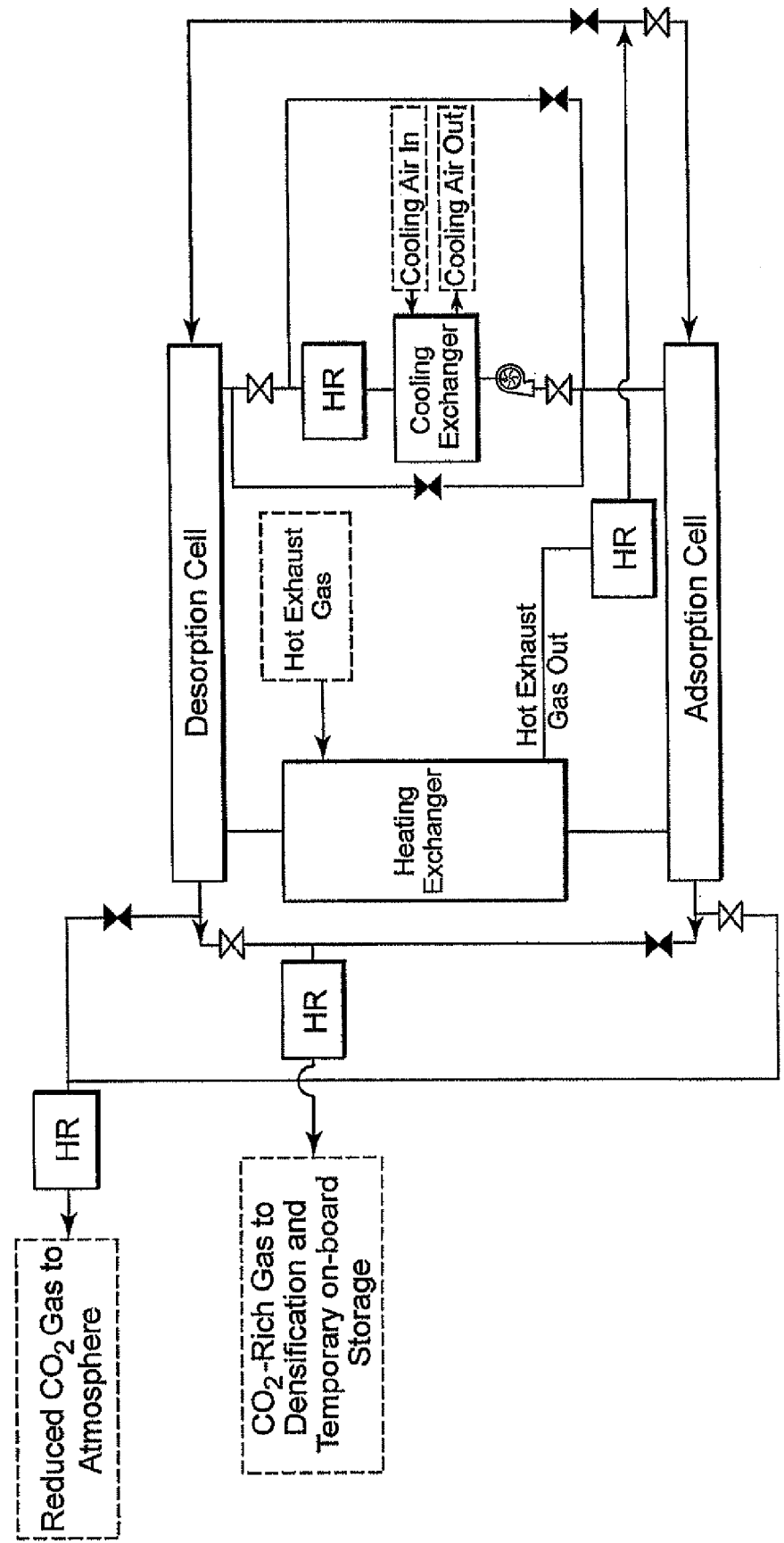
FIG. 5A is a schematic illustration of the system of 5A configured with one of the subsystem being regenerated and the other extracting $CO_2$ from the exhaust gas stream.
Figure 5B:
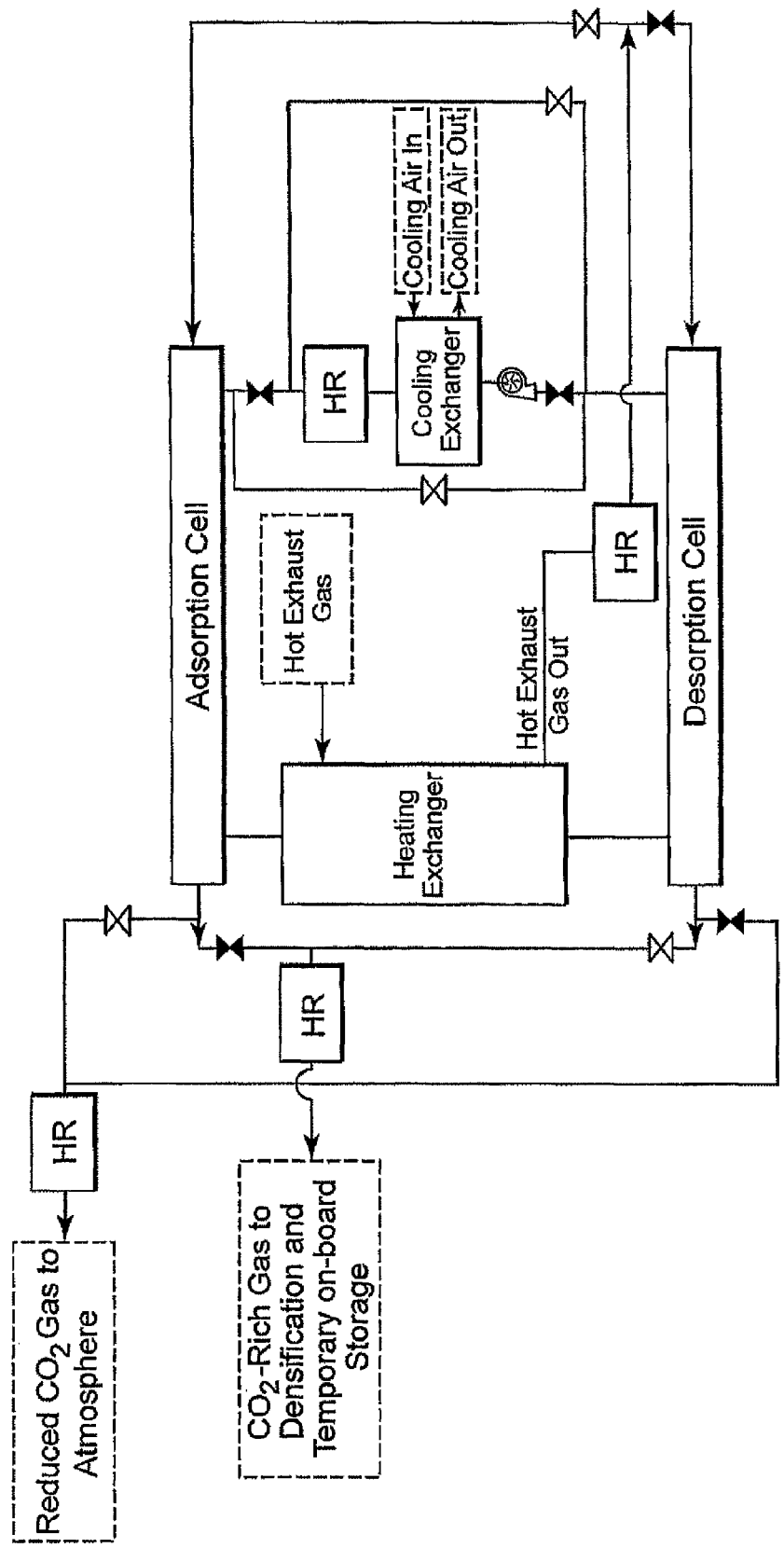
FIG. 5B is a schematic illustration similar to FIG. 5A in which the functions of the subsystems are reversed.

Referring now to FIGS. 5, 5A, and 5B, another embodiment of the system of the present invention is illustrated in which the heat of adsorption is removed and the heat of desorption is supplied using a heat exchange liquid in a closed loop. The system and apparatus is identified generally in FIG. 5 and the specific method of operation in FIGS. 5A and 5B. The hot exhaust gases and air do not pass by the shell side of the cells. Heat is supplied to the liquid through a heat exchanger. The liquid then passes through the shell side of the first cell to provide the heat of desorption to the capture agent. The liquid loses heat and decreases in temperature after passing through the desorption cell. The temperature of the heat exchange liquid can be reduced further using an air-cooled heat exchanger.

The cooled liquid then passes through the shell side of the adsorption cell to remove the heat of adsorption as the exhaust gas stream passes through the tube side and the $CO_2$ is physically and/or chemically adsorbed by the capture agent. As previously described, the swing process between the adsorption and desorption cells can be triggered by detecting the $CO_2$ concentration in the exhaust gas, or after an empirically predetermined period of operating time, or some other parameter(s) that are monitored by sensors of various types and the data processed by engine management system, as described in more detail below.

The remaining $CO_2$-lean exhaust gas stream is released into the atmosphere, and the $CO_2$-rich gas stream is passed to the densification zone where it is pressurized, liquefied or solidified before it is temporarily stored on board until it can be collected.

Another mode of operation of an embodiment of the present invention will be described with reference to FIGS. 8, 9 and 10. In this embodiment, the solid sorbent is placed in each of a pair of cells that are operated in swing mode, i.e., one is adsorbing $CO_2$ while the other is being regenerated by desorbing the $CO_2$ previously captured. The cells are generally of the shell and tube design with the sorbent placed in the tubes for heat exchange with hot/cool gases alternatively passing through the shell. In this embodiment, the captured $CO_2$ is compressed for storage as a gas. It will be understood that further compressing and rapid expansion can be employed to further density the $CO_2$.

As will be described in further detail with reference to the Figures, the solid line schematically represents the exhaust stream 20 emitted from engine 10, the dotted line represents the balance of the exhaust gas stream 56 downstream of the adsorbent cell, the dashed line represents the $CO_2$-rich stream 52 following desorption, the dash-dot line represents coolant air, the dash-dot-dot line is the thermoelectric device cooling circuit, and the dash-dash-dot line represents conduits without active flow and closed valves during the particular operational mode being described.

Figure 8:
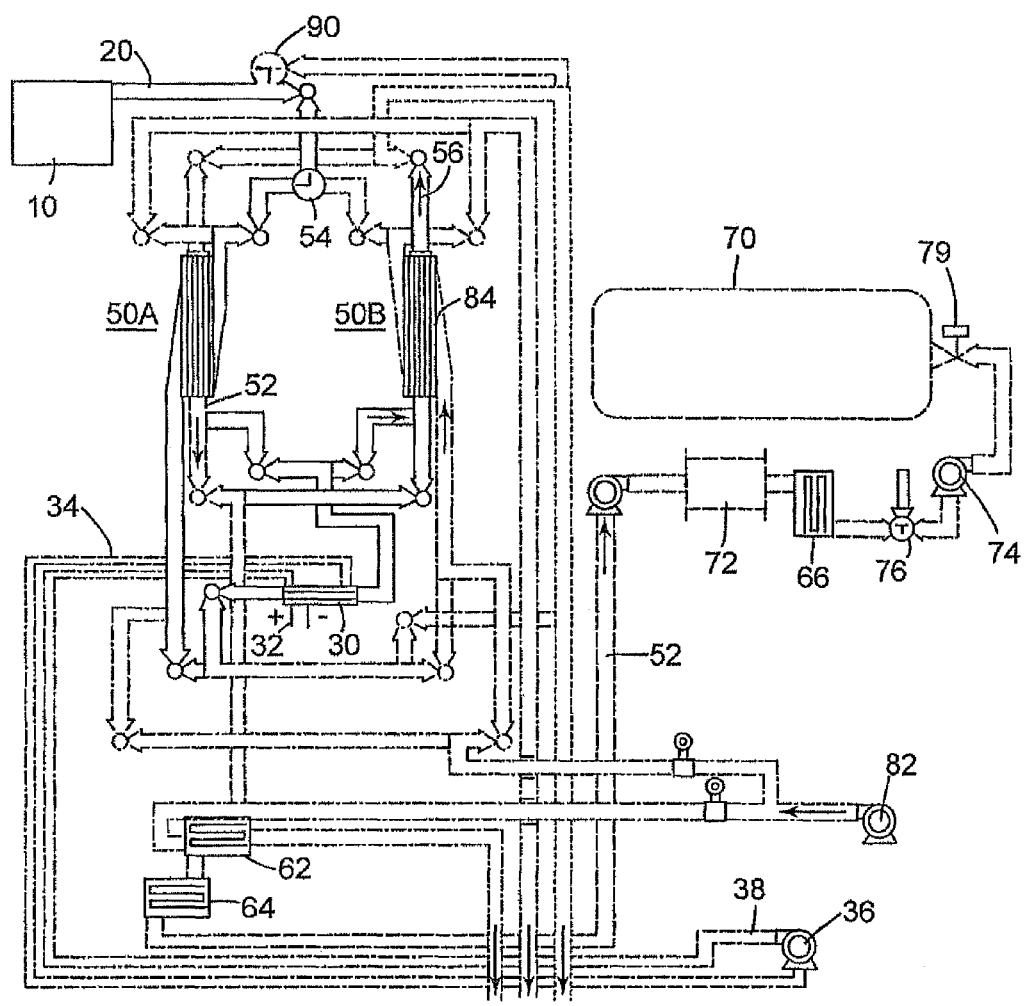
FIG. 8 is a schematic illustration of an embodiment of a system operated in accordance with the method of the invention for the desorption of $CO_2$ from one of a pair of cells containing a solid sorbent.

FIG. 8 schematically illustrates operation of the system during the steady-state after start up of engine 10 with the desorption process taking place in cell 50A and adsorption, i.e., the capturing of $CO_2$, taking place in cell 50B. The exhaust gas stream 20 passes through the shell side of cell 50A to heat the sorbent to provide the required heat of desorption to release the $CO_2$. The exhaust stream then passes through the thermoelectric device 30 to recover some of the sensible waste heat and produce electrical power that is withdrawn through electrical conductors 32. The exhaust stream is then passed through the tube side or interior of cell 50B where $CO_2$ contacts, and is adsorbed by the sorbent material. Air is also supplied at 84 to cool the cell undergoing the adsorption process to remove the exothermic heat of adsorption and maintain the optimum sorbent temperature inside the cell. The remaining exhaust gas stream 56, which includes $NO_x$, water vapor and any remaining $CO_2$ that was not adsorbed is released to the atmosphere via outlet 58.

The desorbed $CO_2$ stream 52 is released from cell 50A and drawn by a vacuum pump 72. The $CO_2$-rich stream is cooled through a series of air and liquid heat exchangers 62, 64, 66 before being compressed by $CO_2$ compressor 74 and stored in the $CO_2$ storage tank 70. When the pressure in storage tank 70 reaches its predetermined maximum value, tank shut-off valve 79 is closed by a signal to the actuator from the system management unit's controller.

The thermoelectric device 30 is cooled using closed circulating liquid cooling system 34 that includes coolant pump 36 and heat exchanger 38. Other means of cooling, including air-cooled, finned or thin plate heat exchangers can be used.

The electrical energy produced by the thermoelectric device 30 can be used to power any one or more of the system components, such as the coolant pump 36, the air blower 82, the vacuum pump 72 or $CO_2$ compressor 74. Alternatively, the electrical energy can be directed to the vehicle's storage battery (not shown).

Figure 9:
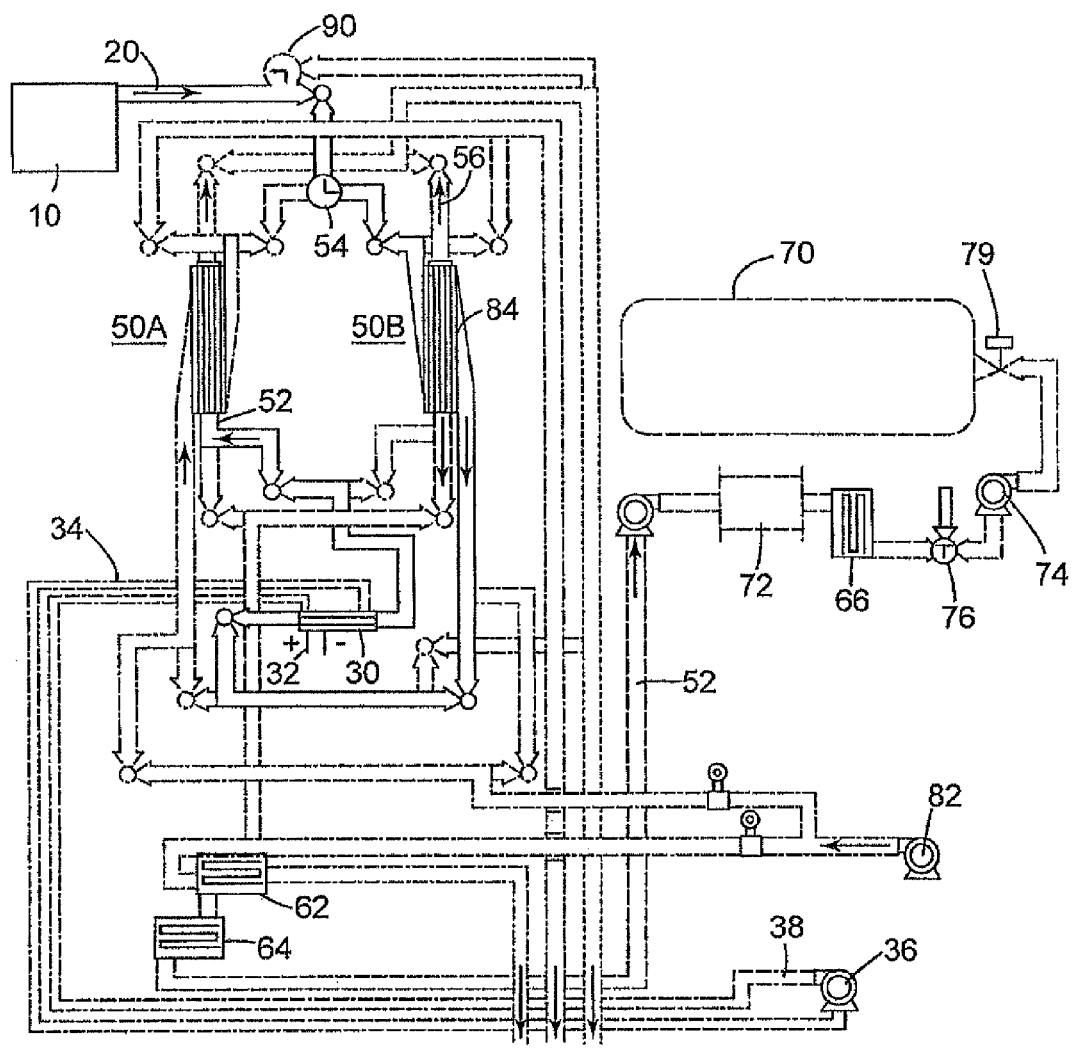
FIG. 9 is a schematic illustration of the system of FIG. 8 for the adsorption of $CO_2$ in other of the pair of cells.

Reference is now made to FIG. 9 which illustrates the stage in the continuous operation when the desorption process is taking place in cell 50B and adsorption is taking place in cell 50A. The three-way valve 54 is actuated to divert the exhaust stream 20 which now passes through the shell side of cell 50B to heat the sorbent and adsorbed $CO_2$ inside and provide the required heat of desorption. The exhaust stream 20 then passes through the thermoelectric device 30 to convert some of its waste heat value and produce electrical power. The exhaust stream is then introduced into the interior or tube side of cell 50A where $CO_2$ is adsorbed on the sorbent material; the balance of the exhaust stream 56 passes from cell 50A and is released into the atmosphere via outlet 58.

In other respects, the functioning of the system and its methods of operation are substantially as described above in connection with FIG. 8.

Figure 10:
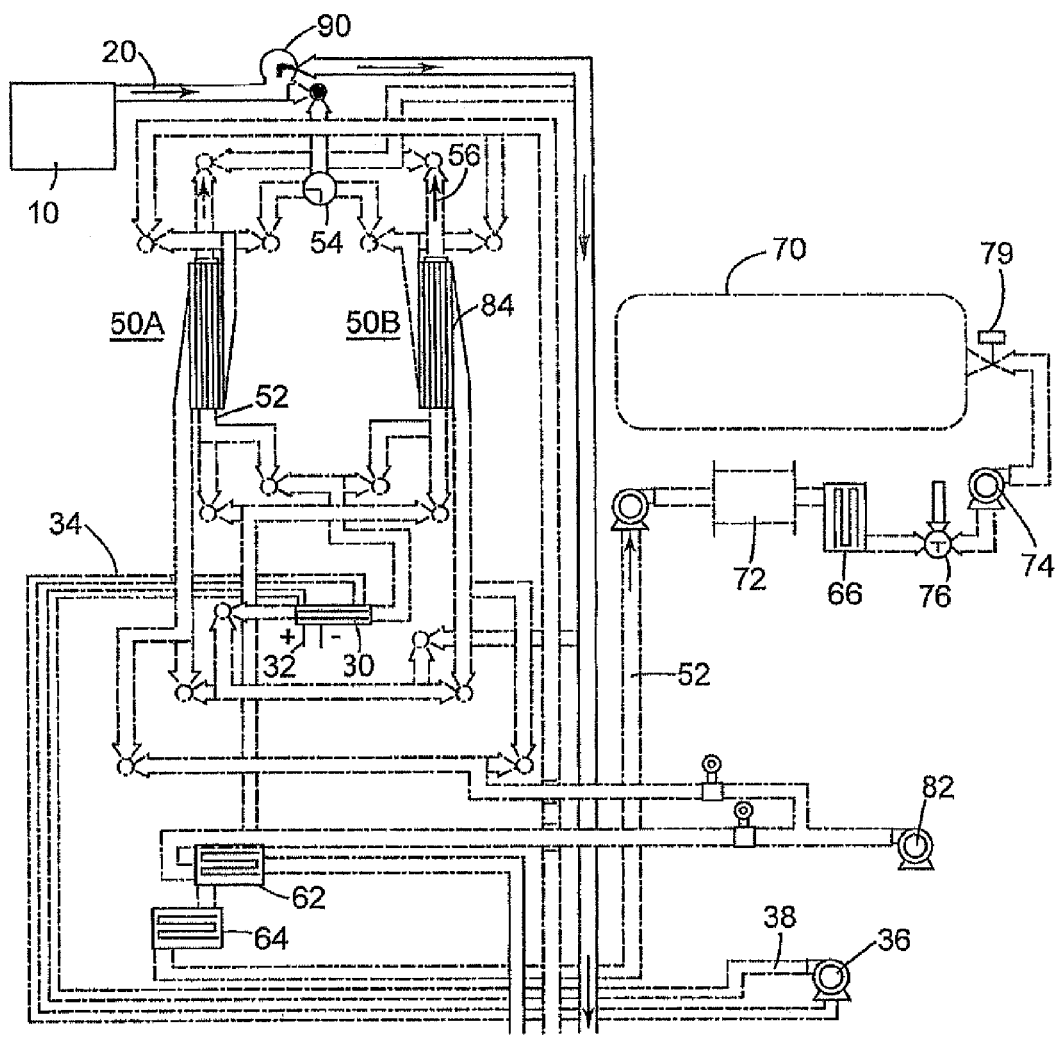
FIG. 10 is a schematic illustration of the system of FIG. 8 in which the exhaust gas stream is shown by-passing the cells.

Referring now to FIG. 10, the mode of operation is illustrated in which the $CO_2$ capture system is by-passed entirely and the exhaust gas stream 20 is released directly to the atmosphere via exhaust outlet 58. Conditions requiring this mode of operation can include the maximum pressure limit being reached in storage tank 70, or the rapid acceleration of the engine 10 which so far exceeds the steady-state condition as to exceed the control capacity of the system.

Also located in the line between the vacuum pump 72 and the $CO_2$ compressor 74 is an adjustable three-way by-pass valve 76 and a $CO_2$ by-pass conduit 78. By-pass valve 76 is activated by the on-board engine management processor/controller in the circumstance, e.g., where the predetermined maximum pressure of $CO_2$ in storage tank 70 has been achieved and it is desired to clear the system of $CO_2$. The by-pass valve 76 and conduit can discharge the $CO_2$ into the atmosphere (not shown) in this case. As described in further detail below, $CO_2$ from the by-pass conduit 76 can also be recycled to the engine 10.

As will be apparent to those of ordinary skill in the art, the operation of the system is preferably automated using state of the art engine management programs with an on-board computer. For simplicity, pressure and temperature sensors are not shown on the accompanying illustrative schematic drawings. Operational feed back loops are routinely provided on components including the vacuum pump 72, the $CO_2$ compressor 74, the liquid coolant pump 36 and the cooling air blower 82.

Pressure sensors with alarm signals and/or automated shut-off switches are associated with the operational characteristics of the air blower 82, the $CO_2$ vacuum pump 72, the $CO_2$ compressor 74 and the $CO_2$ storage tank 70. In particular, when the maximum pressure in tank 70 is reached, a programmed signal activates diverter valve 90 to discharge all the engine exhaust 20 into the atmosphere via exhaust outlet 58.

Temperature sensors in the form of thermocouples can advantageously by used to control the operation of the system. For example, the temperature of the sorbent or sorbent containers is measured via a plurality of thermocouples and monitored by the program to determine when a predetermined temperature is reached that indicates that the sorbent has reach its desired capacity of $CO_2$. The program controller then diverts the exhaust gas stream 20 to the other cell, which in the meantime, has been operating in the desorption mode and its sorbent material has been regenerated and begins adsorbing $CO^2$ while the adjacent cell begins its desorption cycle.

Other automated valve and switch functions can include, but are not limited to closing the $CO_2$ storage tank inlet valve 71 when pressure falls to a predetermined minimum, e.g., 1.5 psig or reaches a maximum value, e.g., 1600 psig; turning off the $CO_2$ compressor if the $CO_2$ storage tank temperature exceeds a predetermined level, e.g., 50° C. or the maximum pressure is reached.

The operating program also receives data related to exhaust gas stream flow rates that is derived, e.g., from engine rpms, or the like, that is empirically correlated by prior laboratory or prototype testing to the adsorption capacity of the sorbent material in the cells 50A and 50B. These correlations are related to the time of the adsorption cycle for the cells based on the total volumetric flow rate of the exhaust gas system, which in turn is used as the variable to control the cycle time. Thus, using the exhaust gas stream flow rate to time the change-over of the cells results in a longer operating cycle at lower engine rpms, i.e., at lower vehicle speeds or while the engine is idling, and relatively shorter times cycles at higher rpms and vehicle speeds.

In a further embodiment of the present invention, a portion of the $CO_2$ that is recovered after regeneration of the capture agent is returned via the by-pass conduit 76 to the intake of engine 10 to be mixed with the atmospheric air and fuel. This aspect of the system operation is similar to exhaust gas recirculation (EGR) that is currently used to reduce engine operating temperatures and thereby to reduce the amount of $NO_x$ compounds produced during the burning of the fuel. An amount of $CO_2$ equivalent to from 5 to 15 percent of the exhaust gas volume can be returned to the intake. Return of the $CO_2$ also reduces the amount of atmospheric nitrogen drawn in with the fuel mixture, which also has the beneficial effect of reducing the $NO_x$ compounds in the exhaust. The percent of $CO_2$ in the exhaust gas stream is also increased.

Recirculation of $CO_2$ can be implemented by the same devices and control systems conventionally employed for exhaust gas recirculation on motor vehicles. The recirculation of $CO_2$ can also be undertaken in conjunction with existing EGR systems. The $CO_2$ can replace all or a predetermined portion of the exhaust gas based upon the engine operating conditions or, in accordance with current practices, discontinuing recirculation entirely such as at start-up when the engine is cold, or during rapid acceleration and/or when the ICE is under a heavy load.

Thermocouples are advantageously used in the control strategy for the operation of the system. One, but preferably a plurality of thermocouples are used to determine the swing operation between cells 50A and 50B by comparing the sorbent temperature to the target adsorption or desorption temperatures that have been predetermined empirically for the particular type of cell and the specific adsorbent material positioned in the cells. Thermocouples are also used to operate the air blower to cool the capture cell as required during the adsorption cycle to dissipate the heat of adsorption. A thermocouple can also be used to control a by-pass valve in the event that the temperature of the exhaust gas stream exceeds the limit for the thermoelectric device in order to avoid damage. A separate thermocouple is also used to protect the $CO_2$ compressor 70 in the event that the inlet temperature of the $CO_2$ exceeds a maximum value, in which case by-pass valve 76 is actuated to discharge the $CO_2$ via conduit 78.

Pressure sensors are also used to facilitate system control. For example, a pressure sensor on the engine exhaust is used to actuate the system by-pass valve 90 in the event that the pressure drop across the system exceeds a value that would affect the performance of the engine. A pressure sensor is used to turn off the $CO_2$ compressor 74 in the event that the suction pressure falls below a predetermined minimum value. A separate pressure sensor is used to turn off the $CO_2$ compressor 74 and isolate the $CO_2$ storage tank 70 if the accumulated pressure reaches a value close to the design pressure of the tank.

In a preferred embodiment, the operation and control of the $CO_2$ capture system and process of the invention is automated. Programmed engine management units include processors and controllers that function based on data and signals from sensors and other devices that monitor the system. Examples of suitable control protocols for various aspects of the operation are provided in the detailed process flow diagrams of FIGS. 11 through 14. In this series of diagrams, "TE" refers to "thermoelectric devices".

Figure 11:
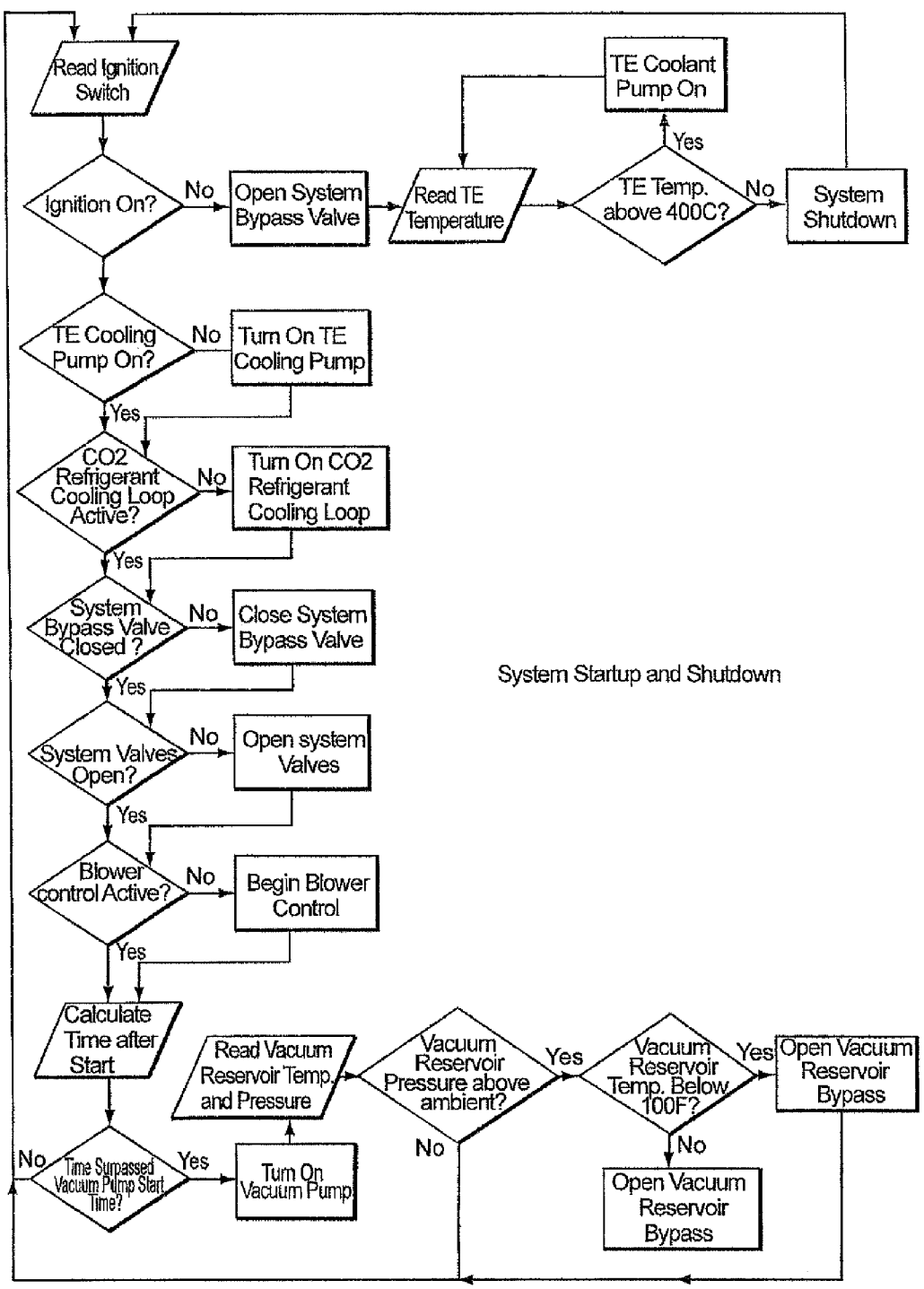
FIG. 11 is a process flow diagram of an embodiment of a stepwise protocol for use with the start-up and shut-down of a system of the present invention.

With reference to FIG. 11, a sequence of operations that includes actuating various apparatus and opening and closing designated valves at the time of starting up and shutting down the system are identified diagrammatically. During system shutdown, all valves are closed in response to signals issued to the valve actuators by the processor/controller. A vacuum reservoir bypass functions to maintain the $CO_2$ compressor inlet below 100° F. in order to avoid raising the temperature due to a heat soaking effect even when the system has been shut off.

Figure 12:
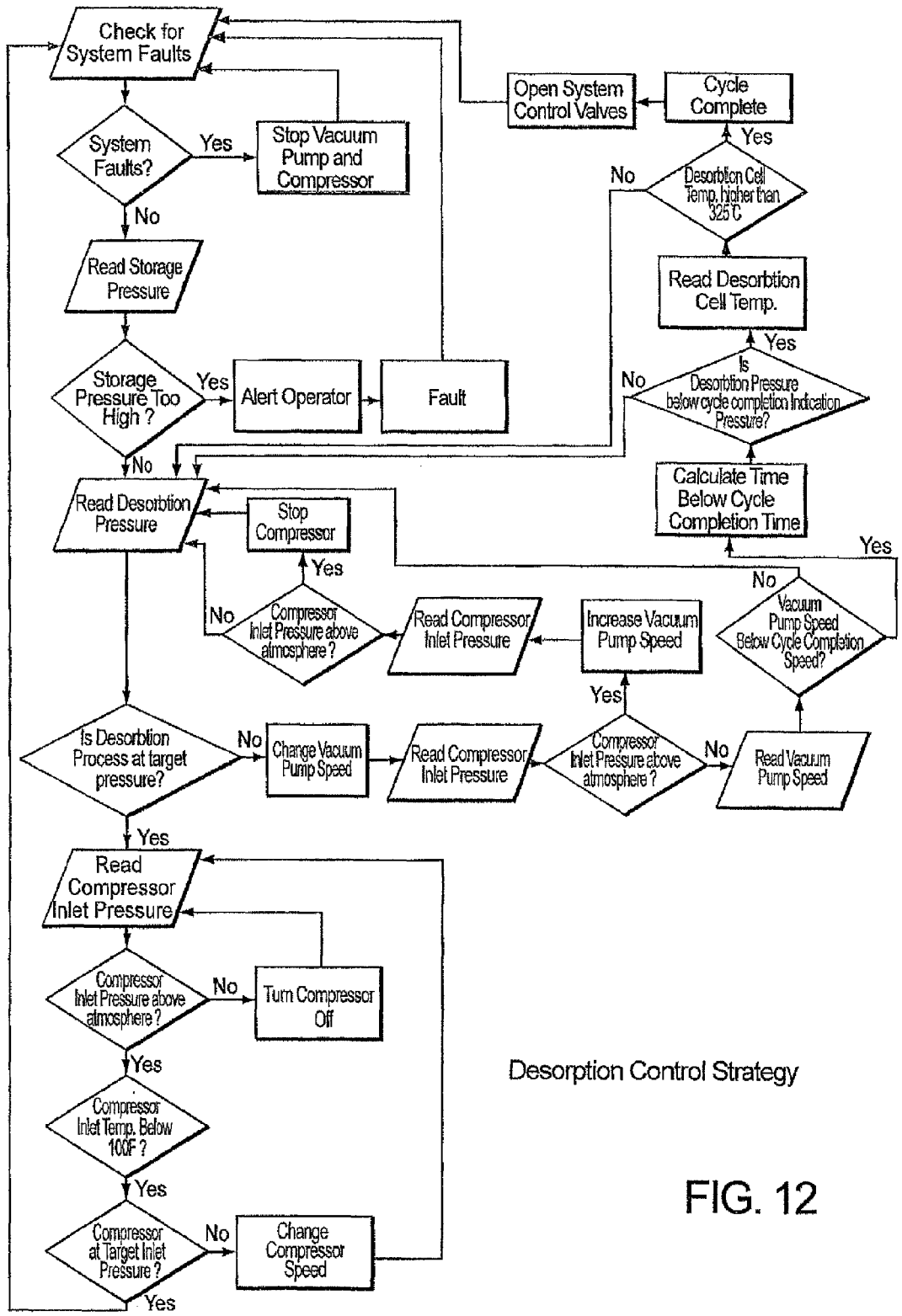
FIG. 12 is a process flow diagram of an embodiment of a stepwise protocol for the control of a desorption process and apparatus in a system of the present invention.

With reference to FIG. 12, a detailed sequence of steps and sensor checks is depicted for the desorption unit operation control strategy.

Figure 13:
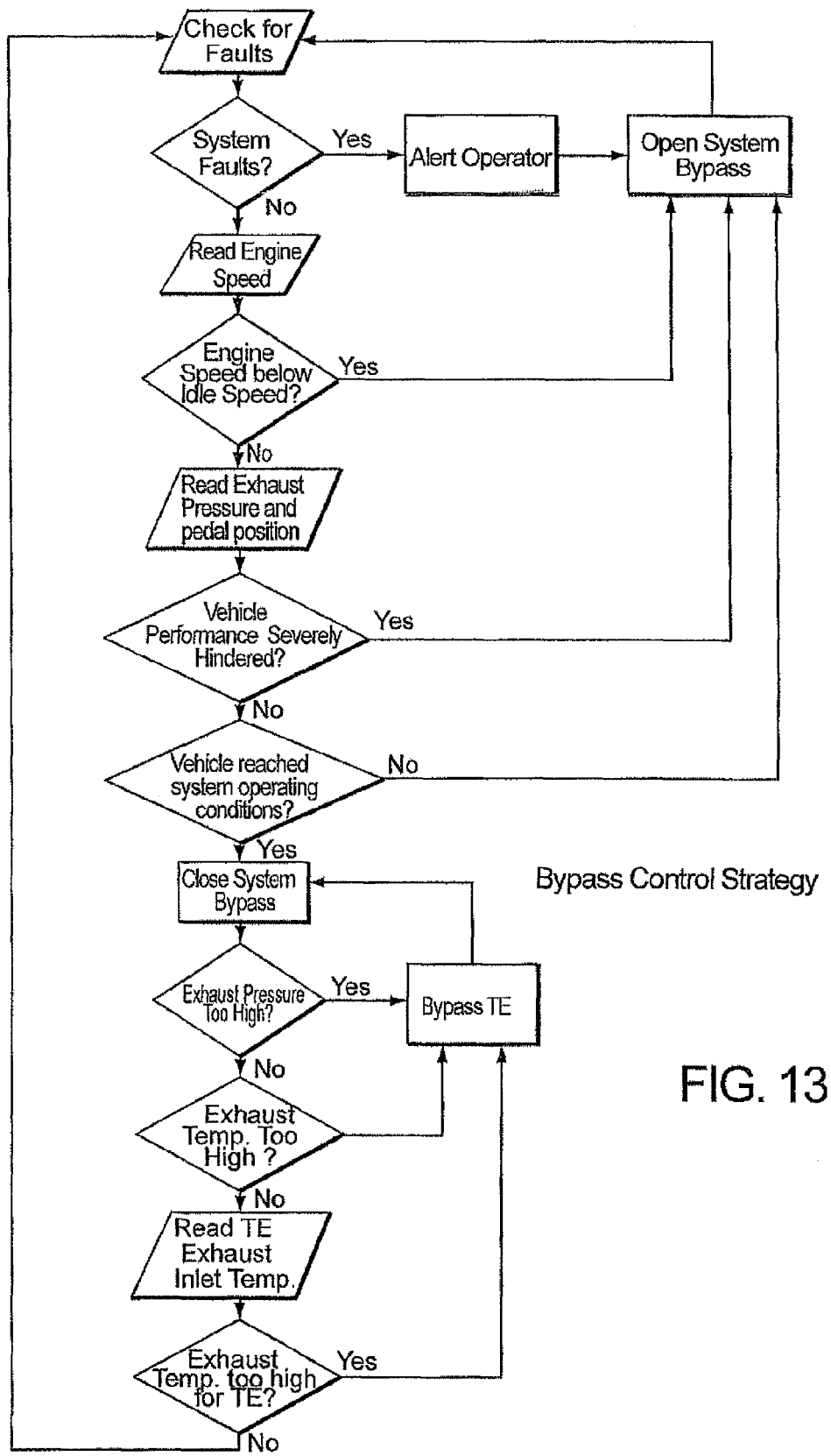
FIG. 13 is a process flow diagram of an embodiment of a stepwise protocol for the control of the activation of the bypass of the process and apparatus corresponding to FIGS. 10-12.

Referring to FIG. 13, a sequence of steps and sensor checks is depicted for the bypass control strategy. In this embodiment, the default position for the system bypass valves is open; in order to pass the exhaust gas stream to the sorbent for capture of $CO_2$, the valve actuators receive a "close" command or signal from the processor/controller. The sequence depicted includes the step "Vehicle Performance Severely Hindered?" Functions such as engine speed, accelerator pedal position and engine manifold back pressure are used to determine if the $CO_2$ sorption system will be bypassed. A severe hindrance of vehicle performance is defined as a reduction in power that is noticeable to the vehicle operator. This step in the diagram can be omitted if it is found that the vehicle's performance is not significantly diminished at any time the exhaust gas stream is passed through the desorber.

Referring now to FIG. 14, a sequence of steps and operations for controlling the air blower is depicted. In view of the detailed nature of the description of each of the steps, and that provided above with reference to FIGS. 8-10, no further explanation is deemed necessary. The system of the present invention is preferably installed to receive and capture $CO_2$ from the exhaust gas stream downstream of the catalytic converter(s) conventionally installed on the vehicle. Conversion of the nitrogen-containing compounds in the exhaust gas stream to nitrogen minimizes the potential presence of combustion products that could affect the adsorbent capacity and cycling lifetime of the adsorbent material. The exhaust gas stream temperature downstream of the catalytic converter(s) is higher and more heat values can be recovered. In addition, when the engine is cold at start-up, the exhaust gas downstream of the catalytic converter will be hotter than upstream due to the exothermic reactions that occur in the converter. It is also preferable to produce the pressure drop relating to the reduction in temperature and the removal of carbon dioxide from the exhaust gas stream downstream of the catalytic converter(s) in order to avoid adversely affecting the designed engine performance characteristics. Positioning the system downstream of the vehicle's catalytic converter(s) also simplifies the discharge of the remaining exhaust gas stream following its passage through the sorbent cell.

Embodiments of the $CO_2$ capture component(s) can include, but are not limited to those which follow.

1. The capture agent can be based on chemical or physical adsorption of $CO_2$ for separation from the exhaust gases, i.e., chemisorbents or physisorbents. Physical adsorbents can include activated carbons, zeolites, metal organic framework (MOF) materials and organic-inorganic hybrids.
2. In selecting the capture agent, consideration must be given to its long-term stability at the respective exhaust gas temperature of the particular vehicular type and system in which it will be deployed. Exhaust gas temperatures for gasoline engines and diesel engines can vary, and gasoline fueled engine exhaust is generally hotter under comparable operating conditions. Other factors to be considered include:
    a. the types of any contaminants that are present in the fuel due to limitations inherent in the refining processes utilized by different producers;
    b. chemical compounds that are inherent in the particular type of fuel and that are oxidized during combustion, such as NOx and SOx; and
    c. chemical compounds that are introduced into the fuel at the refinery, such as detergents, dyes, anti-knock and lubricity additives.
3. The capture agent can be used as solid sorbents, solid carbonates or other materials that are capable of $CO_2$ adsorption. Examples of capture agents include metal oxides, hydrotalcites, zirconates, silicates, aluminates, carbonates, and supported amines. The capture agent can be in the form of a promoted high surface area support, such as potassium-promoted alumina. The $CO_2$ capture agent can comprise a single class or multiple classes of materials.
4. The capture agent can be in different forms. The solid sorbents can be packed, for example, as spherical particles, pellets, granules, monoliths, powders and extrudates, among others. The capture agent can be in the form of hollow-fiber sorbents. Thin fiber matrix tubes can include the $CO_2$ capture agent within the support matrix and contain an inner impermeable tube. Fluid can be used inside the isolated inner tube to supply and remove the heat needed to manage the adsorption and regeneration of the $CO_2$ capture agent. In a presently preferred embodiment, a fiber matrix that is made of thermally conductive material and capable of withstanding high temperatures is used. A number of parallel hollow-fiber sorbent tubes can be used as the $CO_2$ capture component. When the exhaust gas passes through the outer tubes, the $CO_2$ reacts with the capture agent and heat is removed using fluid from the inner tubes. For regeneration of the $CO_2$, fluid supplies the heat for desorption from the inner tubes.

The capture agent can also be applied to the surface of a monolith, which, as defined herein, is a high-surface area support that can take different shapes, such as a pipe with groves that extend along the length of the monolith. The sorbent can be applied on the surface of the monolith to provide high surface interaction with gas and also reduce the pressure drop, which is essential for ICE efficiency. The sorbent can also be loaded inside the groves of the monolith. The monolith can be constructed of a thermally conductive material, e.g., a metal that will enhance the heat transfer properties of the capture's component during the adsorption/desorption.

A highly porous foamed metal can also be used as a carrier for the capture agent. Just as the monolith described above, various structural shapes can be formed from rigid foam metal(s) and coated and/or impregnated with the capture agent.

5. The adsorption and desorption cells can be of different designs. FIGS. 4 and 5 illustrate the capture zone components as shell-and-tube exchangers, where the sorbents are packed in the tubes. Other types of heat exchangers can be used to retain the capture agent(s). These include plate, spiral, cross-flow, and other types. It is possible to combine both the adsorption and desorption zones in one unit to allow for very compact and very efficient exchange of the heat of adsorption/desorption. For example, the sorbent can be loaded in both sides of a swing type device. The heat of adsorption will be released as the $CO_2$ is captured and will be conducted or otherwise conveyed to the other side to provide at least a portion of the heat required for the regeneration of the sorbent.

In addition to packed-bed operation, a set of fluidized beds can be used for the capture component.

6. Two capture cells have been illustrated for the swing process between adsorption and desorption; multiple cells can be used to provide for different adsorption/desorption cycles.

Figure 1:
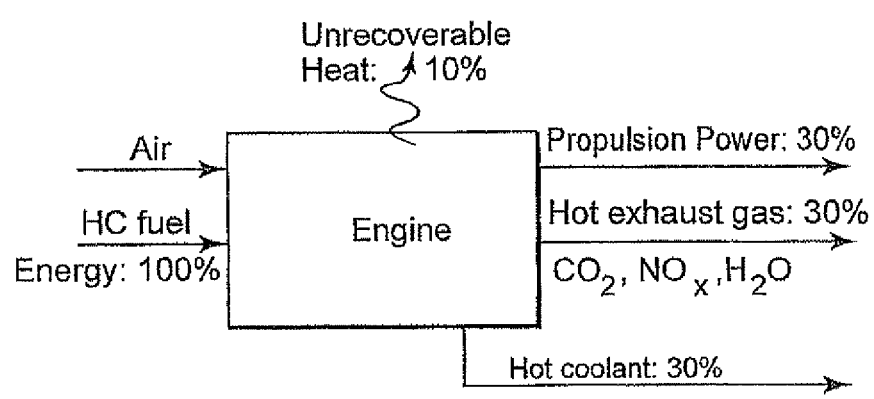
FIG. 1 is a schematic illustration of the conversion of hydrocarbon fuel energy to heat and power, or work, by a typical internal combustion engine.
Figure 2:
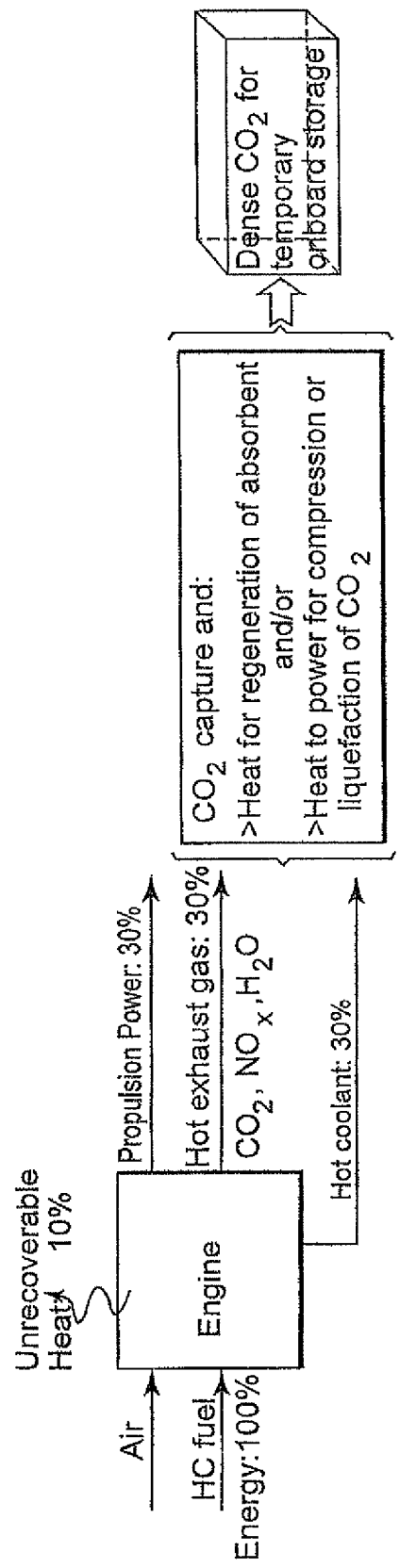
FIG. 2 is a schematic illustration that incorporates FIG. 1 and the method of the present invention.
Figure 3:
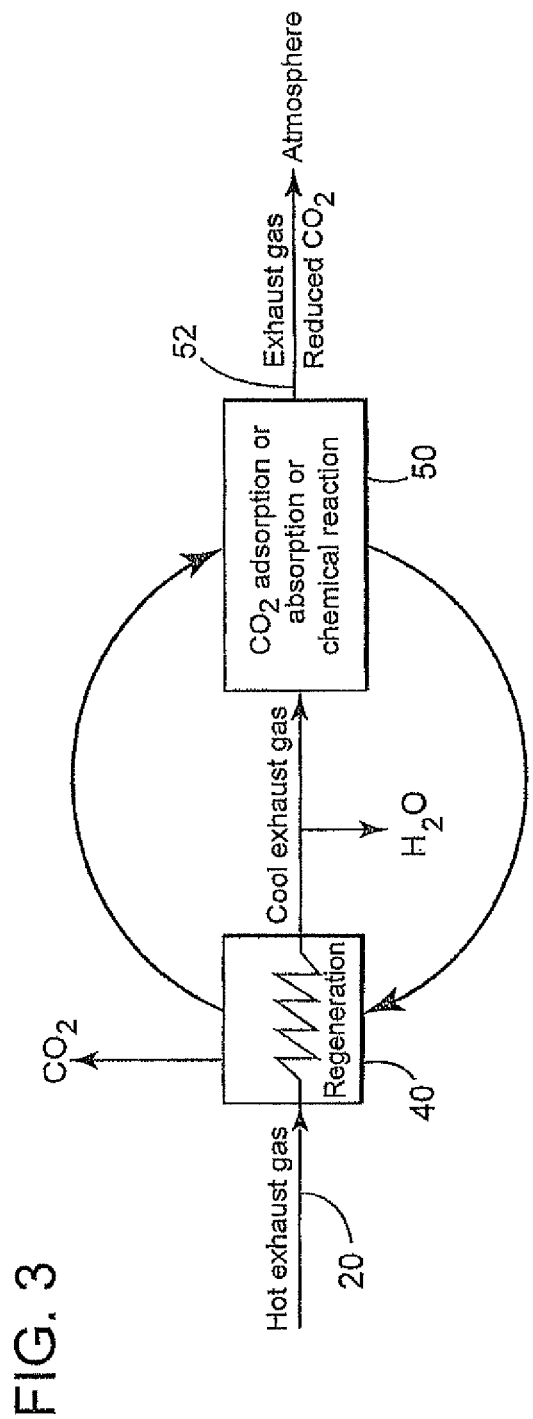
FIG. 3 is a schematic illustration of one embodiment of the method and apparatus employed in the system of the present invention operated in swing mode, using waste heat from the ICE to regenerate the capture agent.

7. In addition to the temperature swing adsorption described in conjunction with FIGS. 3, 4 and 5, other processes such as pressure swing, vacuum swing and electrical swing adsorption can be employed. Swinging the gas flow through the capture cells can be triggered based on detected $CO_2$ concentrations in the exhaust outlet, defined operational times and other criteria that are selected to ensure maximum/optimum utilization of the $CO_2$ capacity of the capture agent.

It has been found that a particularly useful solid sorbent for gaseous $CO_2$ is a mixed salt composition that comprises a mixed salt of a magnesium compound, such as $MgCO_3$ or MgO, and at least one salt of a Group IA metal, wherein the molar ratio of Mg to the Group IA metal can range from 8:1 to 3:1, and is preferably from 6:1 to 4:1. The magnesium compound is preferably MgO and the at least one salt of a Group IA metal is preferably a carbonate, and/or a nitrate salt. An especially preferred sorbent composition is MgO:$Na_2CO_3$:$NaNO_3$, where the molar ratio of Mg:Na is about 4:8 to 1. Salts of Li, K, or Rb can replace the sodium salts in the preferred composition.

The mixed salt sorbents of the invention can be made via, e.g., a gelation reaction, as described below in Example 1, or preferably by a precipitation reaction as described in Example 2. A magnesium salt and a Group IA metal salt are prepared in solution form, and combined to form a reactive mixture. This reaction is optionally carried out with a precipitating agent. The salts are chosen such that, upon reacting with each other, MgO or $MgCO_3$ is formed in the precipitate. Preferably, a highly soluble Mg compound is used, such as MgO itself, $Mg(OH)_2$, or most preferably, $Mg(NO_3)_2$. As noted supra, $MgCl_2$ or $Mg(CH_3COO)_2$ may also be used. Once the Mg salt is chosen, the skilled artisan can determine what Na salt or salts will react with the Mg salt to produce the desired MgO/$MgCO_3$.

Following preparation, the sorbent powder can be made into an extrudate, either via adding a binder, such as boehmite, or via special preparative techniques known in the art which can result in a loss in sorbency; however, the technique is useful for keeping pressure drops low in packed beds, and for rendering handling of the material easier. Using the powdered salts described, a greater $CO_2$ adsorption capacity was found for extrudates made without a binder which achieved $CO_2$ loads of about 20 wt % at 300° C. The crush strength of extrudates without binder was found to be 0.51 MPa, equivalent to those extrudates prepared with boehmite (0.55 MPa).

The reaction is carried out with concentrations of the reactive salts which provide for a ratio of Mg:Group IA metal of from 3:1 to 8:1, most preferably from 4:1 to 6:1. The choice of ratios is one left to the artisan because, as noted supra, by varying the ratio one produces sorbents with different properties. Knowing the conditions under which the sorbent will operate will determine the ratios employed. Optionally, a precipitating agent can be added to facilitate the reaction, such as $NaNO_3$. The precipitating agent is preferably a salt of a Group IA metal.

EXAMPLE 1

This example describes the preparation of a solid $CO_2$ sorbent for use in the process of the invention by what is referred to as a gelatin process. An amount (395 g) of magnesium carbonate hydroxide ($MgCO_3 \cdot Mg(OH)_2 \times H_2O$) was added to 800 ml of a solution of sodium carbonate (42.18 g) and sodium nitrate (21.63 g) dissolved in deionized water. This produced a mixed salt slurry which was stirred for 30 minutes. The slurry was then covered and allowed to sit for 16 hours at ambient temperature, after which it was dried at 120° C. for 16 hours to form a dry cake of MgO:$Na_2CO_3$:$NaNO_3$. Analysis showed a mass ratio of 75.8:16:8.2 and a molar ratio of Mg:Na of about 4.8. This dry cake was then calcined by heating from 120° C. to 450° C., at a ramp rate of 3° C./minute, followed by 450° C. for 4 hours. The calcined cake was crushed and sieved to collect a 150-425 mesh fraction, which is suitable for use in a packed bed with an inert material such as SiC to occupy any remaining volume. Test results indicated that the loading of $CO_2$ on the sorbent reached its maximum at 300° C., but that the sorbent was effective over a broader range of temperatures.

EXAMPLE 2

This example describes preparation of a solid $CO_2$ sorbent of the same mixed salt composition for use in invention by what is referred to as a precipitation process. A solution of 233.4 g of $Na_2CO_3$ in 3000 ml deionized water was placed in a 5.0 liter plastic beaker, and stirred vigorously with a mechanical agitator. A second solution, of 188.4 g $Mg(NO_3)_2$: 6 $H_2O$ in 500 ml of deionized water, was pumped into the first solution, at a rate of approximately 30 ml/minute. A slurry resulted which was stirred for an hour. The slurry was stored, overnight, as described supra, and then filtered to yield a wet precipitate cake. About 3200 mls of filtrate were collected. This was dried, at 120° C. for 24 hours to form a dry cake, which was treated a described in Example 1. Test results indicated that the amount of $CO_2$ loaded on the sorbent reached its peak at 325° C., and as with the sorbent from Example 1, the sorbent product from this example was also effective over a wide temperature range.

The effect of the alkali component in the mixed salt sorbent composition was evaluated using Li, Na, or K salts to prepare the final sorbent products. Salts were prepared in the manner set forth, supra, using a molar ratio of Mg:alkali metal of 6:1. The resulting products were tested for their ability to remove $CO_2$ from a simulated exhaust gas stream. Adsorption was carried out at temperatures ranging from 100-450° C., at GHSV of 3,125/hour. The sorbents were regenerated by ramping temperatures to 450° C., at a rate of 10° C./minute, and a GHSV of 2500/hour.

Results indicated that Na produces the best operational temperature range and that Li and K alkali metals function well at different temperatures. The sorbent containing sodium adsorbed $CO_2$ over a temperature range of 200° C. to 400° C., reaching a maximum at 325° C. The powder containing lithium was most effective at 200° C. and was effective to about 250° C., while the compound containing potassium adsorbed $CO_2$ at a higher temperature ranging from about 300° C. to about 400° C.

Additional tests indicated that the mixed salt compositions of the invention should have either $Mg_2CO_3$ or MgO as a component, and in the preparation of these sorbents, an Mg compound preferably is selected which will lead to one of these.

$Mg(NO_3)_2$, MgO, and $Mg(OH)_2$ were all tested using the same parameters of Examples 1 and 2. The nitrate salt produced a sorbent with a significantly greater ability to adsorb $CO_2$ than the MgO or $Mg(OH)_2$ salt, but all adsorbed $CO_2$.

It is noteworthy that $Mg(NO_3)_2$ has significantly greater solubility in water than the other compounds. The differences in solubility also indicate that the final products result from different reactive mechanisms. The nitrate salt, for example, participates in anion exchange with the sodium salts, whereas the oxide and hydroxide do not. Hence, the more soluble the magnesium salt, the greater the adsorption ability of the final product. $Mg(NO_3)_2$, $MgCl_2$, $Mg(CH_3COO)_2$, and other highly soluble magnesium salts are thus preferred in making the sorbents of the invention.

The concentration of sodium affects performance of the sorbents, with optimum adsorption capacity at different temperatures. A decrease in the concentration of Mg relative to Na resulted in a change in the peak $CO_2$ loading temperature to from 250° C. to 275° C. as compared to 325° C.-350° C. In contrast, an increase in $CO_2$ loaded on the sorbent was observed, from about 20 wt % as compared to 12-13 wt % for the higher concentrations.

While the above tests used $Na_2CO_3$ as a precipitating agent, others can be used, as was exemplified with $(NH_4)_2CO_3$.

To prepare the sorbents with $Na_2CO_3$, the precipitating agent was added slowly in the form of a solution, to a solution of $MgNO_3$. The $(NH_4)_2CO_3$ was added to a solution of $MgNO_3$ and $Na_2NO_3$ while maintaining the Mg:Na molar ratio of 6:1.

The results showed that the product obtained with $Na_2CO_3$ exhibited a broad range of activity, whereas that prepared with $(NH_4)_2CO_3$ showed a very sharp spike in $CO_2$ adsorbence activity at 300° C., and very little activity at other temperatures. These results suggest that changes in the precipitating agent can be used to prepare sorbents for different applications.

In the practice of the invention, $CO_2$ is adsorbed from an exhaust gas stream by contact with the mixed salt sorbent described at a temperature which ranges from about 100° C. to about 450° C., preferably from about 250° C. to about 350° C., for a time sufficient for the sorbent to remove all or a portion of the $CO_2$ from the exhaust gas stream. As previously described, the sorbent will become saturated with $CO_2$, and this can be determined by measuring and comparing the content of $CO_2$ in exhaust gas stream before and after contact with the sorbent. When it is evident that no further $CO_2$ is being removed from the exhaust stream, the sorbent can be regenerated by, e.g., heating it to its desorption temperature, e.g., about 500° C. Again, by measuring the amount of $CO_2$ which is contained in the exiting gas, the ordinarily skilled artisan can determine when the sorbent is ready for reuse.

The $CO_2$ densification component can be accomplished by single or multiple stage compressor with an appropriate active/passive cooling system to ensure pressurization, liquification or solidification of $CO_2$ for the temporary on-board storage. The $CO_2$ storage can be in a single tank or in multiple tanks on board the mobile source. The fuel tank can also be used to store the captured $CO_2$ by having a moving partition between the fuel side and the $CO_2$ side. Control of all of the system components can be integrated with the mobile source's control system or a separate control system to optimize performance.

Figure 6:
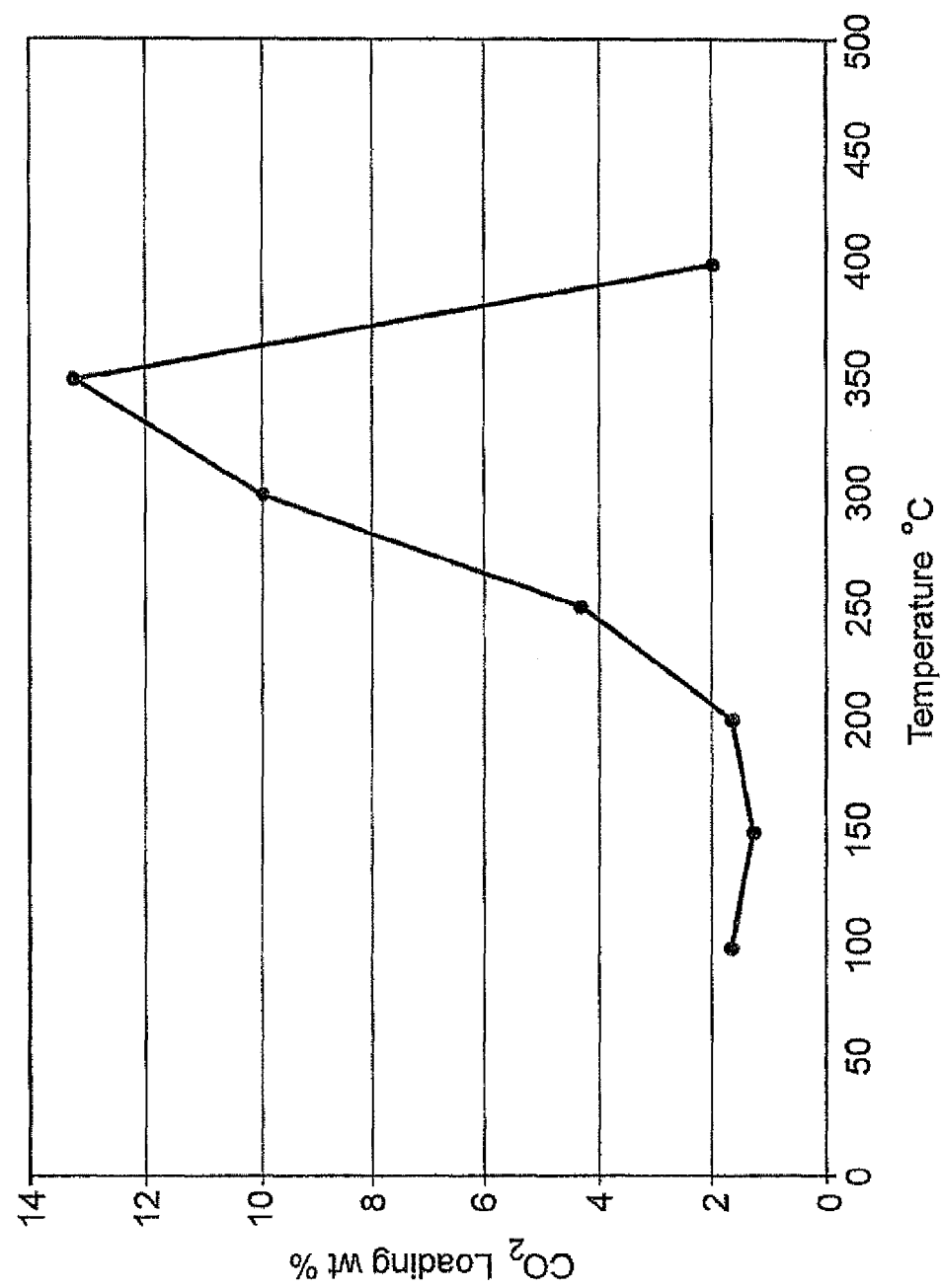
FIG. 6 is a chart illustrating the typical variation of $CO_2$ adsorption capacity in relation to the operating temperature of solid alkaline earth metal and alkali metal compounds.

Heat management is required to control the adsorption and desorption cycles of the $CO_2$ capturing agent. As illustrated graphically in FIG. 6, the $CO_2$ absorption capacity of a sorbent can vary significantly with temperature. In the example shown, capacity increases to a maximum as the temperature approaches 350° C., and then rapidly diminishes between 350° C. and 400° C.

In general, commercially available plate-type compact heat exchangers have been found to be effective in reducing the temperature of the exhaust gas stream. They are available in a variety of sizes and materials of fabrication. The large heat transfer surface permits use of a relatively smaller device, saving both on volume and weight added to the vehicle.

Heat will have to be removed from the capture components) as the $CO_2$ is adsorbed (physically or chemically) on the agent and the heat of adsorption is released. Heat will have to be supplied to the capture component(s) to provide the required heat of desorption/regeneration when the $CO_2$ is released from the agent. Supply and removal of heat can be accomplished using different methods including conduction, convection, radiation, generation, and/or a combination of these methods.

In the case of conduction, heat can be supplied or removed from the $CO_2$ capture agent using a thermal conducting material, such as metal. If the $CO_2$ capture agent is packed in tubes, the heat can be removed from the outside of tubes using conduction through the tube shell. Fluids can be used to supply or remove the heat from the outer shell of the tubes. Fins, metal mesh inside the tubes and other designs and known techniques can be used to increase the surface area in contact with the agent and enhance the heat transfer. Fins and other surface changes can also be used on the outer shell of the tube to enhance the heat transfer of the system. The $CO_2$ agent can also be packed or loaded on the outside of the tubes and the inside of the tube used to supply or remove the heat using fluids. The $CO_2$ capture agent can be coated on, or loaded in a monolith-type capture component, where the support materials are good thermal conductors, such as metal. The heat can be supplied or removed using thermal conduction through the monolithic support.

For convection heat exchange, heat is supplied or removed from the $CO_2$ capture agent using a fluid. For example, if the $CO_2$ capture agent is loaded inside tubes, fluid can supply or remove the heat from the outer shell of the tubes or through direct contact with the agent. If the $CO_2$ capture agent is coated or loaded in monolith-type capture components, fluid can supply or remove the heat from the outer shell of the monolith, e.g., by direct contact with the agent or by using tubes that penetrate the monolithic support.

For radiant heat exchange, heat can be supplied to the agent for regeneration. High-temperature sources or microwave can be used to supply the heat. Heat can also be supplied to the $CO_2$ capture agent though a heat generating component(s) such as electric heaters powered, e.g., by thermoelectric devices.

FIGS. 4, 4A, 4B, 5, 5A and 5B also show optional locations for the heat recovery (HR) components which serve to convert heat energy to mechanical work or electrical power that can be used to operate the densification apparatus of the system and other auxiliary equipment, such as valves. Liquids are capable of carrying and delivering the large amount of heat that these adsorbents exchange during adsorption and regeneration. The heat capacity of liquids per unit of volume, i.e., their volumetric heat capacity, is about 100 times greater than that of gases. Thus, for the same volume, a liquid can remove or provide heat at a rate which is about 100 times greater than a gas. Similarly, for the same quantity of heat to be added or removed, the volume of liquid needed is but about $\frac{1}{100}^{th}$ of the volume of gas that would be required.

Single or multiple technologies can be used to convert the waste heat to electrical energy or work to compress the $CO_2$ and power the auxiliary equipment. The size or capacity, location and operating conditions of the HR components are determined based upon the availability of waste heat, e.g., from the engine exhaust stream. This will include both temperature and the volumetric flow rate of the waste heat stream, whether it be the exhaust or engine coolant. A single or more than one type of heat recovery component can be employed depending upon the nature of the waste heat stream and its temperature and flow conditions.

The operation of the heat/energy recovery system can be controlled by a pre-programmed processor and controller that receives data from temperature and flow sensors, and that is in controlling communication with flow-regulating valves. For example, the temperature of the engine exhaust gas can be controlled by passing it into heat exchange contact with the container of saturated adsorbent material in order to raise its temperature sufficiently to release the $CO_2$. The exhaust gas having a lower temperature can then exchange further heat with a thermoelectric device to produce electricity. Finally, the exhaust gas of relatively lower temperature can be introduced into the adsorbent zone for reduction of its $CO_2$ content before being discharged into the atmosphere.

The type of heat recovery (HR) component(s) used in the practice of the invention can include, but are not limited to the following types of apparatus.

1. Thermoelectric devices, or modules, that generate electric power. The hot side of the thermoelectric module is installed on the exhaust gas side and the cold side is installed in a closed cooling system referred to as an (active system) or exposed to air (a passive system). The thermoelectric module(s) remove part of the heat from the hot side and generate electrical power that can be used to operate the densification apparatus and/or other on board equipment.

Thermoelectric devices used to convert the waste heat to electrical energy can be placed in different locations and arrangements to optimize the energy conversion. The thermoelectric devices can be secured in heat conductive contact with the exhaust pipe, capture components, engine block or other engine components as the hot side of the device. The cold side of the thermoelectric device can be exposed to air convection to cool the device. The cold side of the thermoelectric device can also be in contact with an active cooling system, e.g., a circulating liquid, to facilitate heat transfer and also control the thermoelectric module's performance.

The thermoelectric devices can assume different shapes such as cylindrical or rectangular pipes to minimize the pressure drop effects on the exhaust gases. Internal and/or external fins can also be used to enhance the heat transfer of the thermoelectric devices and hence their performance. Thermoelectric device could be mounted very close to, or on the engine block to make use of the high temperatures. Appropriate materials are selected to withstand the high temperatures.

2. Electrical power generated using thermoelectric module(s) can be supplied to an electrical storage system, e.g. batteries, which in turn supply the electrical power to the densification apparatus and/or other equipment. Selection of the semiconductors for the thermoelectric module(s) is based upon the temperature range of the application. Stacking of different thermoelectric devices can be used to optimize the heat recovery and hence the electrical energy generation.

3. A Stirling engine in which the waste heat from the ICE exhaust is supplied to the wall of one or more cylinders of the engine to expand the gas in the cylinder to thereby drive a piston that can perform the necessary mechanical work to run the densification compressor or to run the compressor of a compression refrigeration cycle unit that provides cold refrigerant to liquefy or solidify the $CO_2$.

4. A steam generator that provides steam to a turbine which generates mechanical work to run the densification compressor or to run the compressor of a compression refrigeration cycle unit that provides cold refrigerant to liquefy or solidify the $CO_2$.

5. A small shape memory alloy engine or compressor, utilizes the waste heat to change the shape of an alloy (such as CuSn, InTi, TiNi, and MnCu) and generates mechanical work that is used to increase the density of the captured $CO_2$. The engine compressor works by having a hot side and a cool side of the alloy to generate the compression needed. The following patents describe heat engines based on these types of unusual alloys: U.S. Pat. Nos. 3,913,326; 4,055,955; 5,442,914; 7,444,812; and published application 2009/0315489. The disclosures of these patent documents are incorporated herein by reference.

6. Single or multiple heat recovery systems can be installed on the exhaust gas and coolant systems.

7. Single or multiple heat recovery systems can be installed to generate the required power and effectively control the temperature of the exhaust gas.

8. In addition to supplying power, the heat recovery component(s) can be used to control the temperature of the exhaust gas and hence optimize the performance of the $CO_2$ capture agent.

In a further embodiment of the present invention, a portion of the $CO_2$ that is recovered after regeneration of the capture agent is returned via a suitable conduit to the air intake of the engine to be mixed with the atmospheric air and fuel. This aspect of the system operation is similar to the known methods for exhaust gas recirculation (EGR) that is currently used to reduce engine operating temperatures and thereby to reduce the amount of $NO_x$ compounds produced during the burning of the fuel. An amount of $CO_2$ equivalent to from 5 to 15 percent of the exhaust gas volume can be returned to the intake. Return of the $CO_2$ also reduces the amount of atmospheric nitrogen drawn in with the fuel mixture, which also has the beneficial effect of reducing the $NO_x$ compounds in the exhaust. The percent of $CO_2$ in the exhaust gas stream is also increased, thereby enhancing recovery.

Recirculation of $CO_2$ can be implemented by the same devices and control systems conventionally employed for exhaust gas recirculation on motor vehicles. The recirculation of $CO_2$ can also be undertaken in conjunction with existing EGR systems. The $CO_2$ can replace all or a predetermined portion of the exhaust gas based upon the engine operating conditions or, in accordance with current practices, discontinuing recirculation entirely such as at start-up when the engine is cold, or during rapid acceleration and/or when the ICE is under a heavy load.

In a further embodiment of the invention, a portion of the $CO_2$ recovered directly from the exhaust gas stream or the densified storage container is mixed with water and catalytically reacted using known methods to form methane and water by the interim reaction of hydrogen and carbon monoxide that are formed in situ. The methane and water are then used to supplement the conventional hydrocarbon fuel supplied to the engine intake. The water reacted with the $CO_2$ can be recovered from the exhaust gas stream or from a separate on-board source provided for that purpose.

Another advantage of the method and system of the present invention is the availability of pressurized $CO_2$ on board the vehicle for use in the vehicle's air conditioning system. The $CO_2$ is used in place of man-made hydrofluorocarbon chemicals and refrigerants of the Freon type which have been shown to pose risks for harming the environment.

The methods and systems of this invention are suitable for use in a wide range of mobile sources such as passenger vehicles, trucks, buses, heavy-duty vehicles, train, ships and others that operate through the combustion of hydrocarbon fuels. This invention can be installed on new mobile sources or by retrofitting existing mobile sources.

The present invention addresses post-combustion $CO_2$ capture and on-board storage from mobile sources. To minimize operational cost and equipment requirements, the available heat, which is conventionally discharged into the atmosphere, is used to provide the energy needed to separate the $CO_2$ extracted from the combustion gases from the adsorbent material, or capture agent, and to compress/liquefy all or part of the produced $CO_2$ for efficient on-board storage. The captured $CO_2$ can be stored on board until refueling, when it is discharged or removed for recovery at the fueling station. The apparatus of the invention is easier to deploy on board as compared to methods that have been proposed that involve chemical reactions, such as reforming, or major changes in engine design, such as by providing cylinder walls that are permeable to $CO_2$.

Although various embodiments of the invention have been described above and in the attached drawings, other modifications and variations will be apparent to those of ordinary skill in the art from this description, and the scope of the invention is to be determined by the claims that follow.

The invention claimed is:

1. An integrated method for reducing the amount of $CO_2$ discharged into the atmosphere with an exhaust gas stream emitted by an internal combustion engine (ICE) used to power a vehicle, the method comprising:
   a. passing the exhaust gas stream into contact with a $CO_2$ capture agent on board the vehicle, the capture agent having a predetermined capacity to extract $CO_2$ from the exhaust stream;
   b. discharging a treated exhaust gas stream having a reduced $CO_2$ content into the atmosphere;
   c. discontinuing the passage of the exhaust gas stream in contact with the capture agent when the concentration of the $CO_2$ extracted by the capture agent has reached a predetermined level;
   d. heating the $CO_2$ capture to release the extracted $CO_2$ and regenerate the capture agent by heat exchange with a hot engine coolant stream at a temperature in the range of about 90° C. to 120° C. and the hot exhaust gas stream at a temperature in the range of about 300° C. to 650° C.;
   e. recovering an essentially pure $CO_2$ gas stream;
   f. recovering heat and energy from the hot exhaust gas stream emitted by the ICE by contact with an energy conversion medium;
   g. compressing the recovered $CO_2$ gas on board the vehicle to reduce its volume using the energy recovered in step (f); and
   h. temporarily storing the compressed $CO_2$ on board the vehicle.

2. The method of claim 1 which operates substantially continuously following start-up of the vehicle's ICE.

3. The method of claim 1 which further includes measuring the $CO_2$ level remaining in the treated exhaust gas stream and comparing the value of the measured level to a predetermined limiting value.

4. The method of claim 3 where the limiting value corresponds to the predetermined capacity of the $CO_2$ capture agent and the passage of the exhaust gas stream in contact with the $CO_2$ capture agent is discontinued when the limiting value is reached.

5. The method of claim 1 in which the heat exchange occurs in a tube and shell heat exchanger.

6. The method of claim 1 in which the $CO_2$ capture agent is a high temperature solid adsorbent selected from the group consisting of chemical adsorbents and physical adsorbents.

7. The method of claim 1 in which the $CO_2$ capture agent is selected from solid adsorbents and liquid adsorbents on a solid carrier.

8. The method of claim 1 in which the $CO_2$ capture agent is a solid adsorbent that is contacted with the exhaust gas stream in a fixed bed or a fluidized bed.

9. The method of claim 1 in which a portion of the heat energy of the exhaust stream is utilized in the regeneration step (d) and compression of step (g).

10. The method of claim 1 in which the $CO_2$ content of the exhaust gas stream is reduced by at least 10%.

11. The method of claim 1 in which the capture agent is maintained in two separate swing zones and the exhaust gas is passed through one of the zones while the other zone is heated to release $CO_2$ and regenerate the capture agent.

12. The method of claim 1 in which the hot exhaust from the vehicle's engine is passed in heat exchange relation in step (d) to regenerate the capture agent.

13. The method of claim 1 in which the passage of the exhaust gas stream in contact with the capture agent in step (c) is discontinued when the temperature or rate of increase of the temperature of the capture agent reaches a predetermined value.

14. The method of claim 13 in which the temperature is measured by a plurality of temperature sensors in contact with the capture agent.

15. The method of claim 1 in which the passage of the exhaust gas stream in contact with the capture agent in step (c) is discontinued when the pressure or the rate of increase of the pressure in a vessel containing the capture agent of step (c) during its heating in step (d) reaches a predetermined value.

16. An integrated system for on-board treatment of an exhaust gas stream containing $CO_2$ emitted by a hydrocarbon-fueled internal combustion engine (ICE) used to power a vehicle in order to reduce the amount of $CO_2$ discharged into the atmosphere, the ICE including a liquid coolant system, the system comprising:
   a. a treatment zone on board the vehicle containing a capture agent having a predetermined capacity for extracting $CO_2$ from the exhaust stream,
      the treatment zone having an inlet for admitting the exhaust gas stream and an outlet for passage of a treated exhaust stream having a reduced $CO_2$ content,
      the treatment zone further including a heat exchanger with an inlet for receiving the hot exhaust gas stream that has a temperature in the range from about 300° C. to 650° C. from the ICE tor passage in heat exchange relation with the capture agent to heat the capture agent to a temperature in the range from about 300° C. to 500° C. to release $CO_2$ and regenerate the capture agent, and an outlet for the cooled exhaust gas stream,
      an inlet for receiving a hot engine coolant stream that has a temperature in the range from about 90° C. to 120° C. for passage in heat exchange relation with the capture agent to release $CO_2$ and regenerate the capture agent, and an outlet for the cooled coolant stream,
      the treatment zone having a $CO_2$ discharge outlet for $CO_2$ released from the regenerated capture agent;
   b. a compression zone in fluid communication with the $CO_2$ discharge outlet from the treatment zone, the compression zone including one or more compressors for reducing the volume of the $CO_2$;
   c. a storage zone for receiving the compressed $CO_2$ for temporary storage on board the vehicle; and
   d. an exhaust gas conduit in fluid communication with the treated exhaust gas stream outlet from the treatment zone.

17. The system of claim 16 in which the treatment system is comprised of at least two parallel subsystems configured and constructed to operate in swing mode, with valves to direct the vehicle's exhaust to one and then another of the at least two subsystems for extraction of $CO_2$ and simultaneously regenerate the capture agent in another of the at least two subsystems, whereby the system is operable continuously to treat the engine exhaust stream.

18. The system of claim 16 which includes a diverter valve for regulating the volumetric amount of the exhaust gas stream which passes into the treatment zone before being discharged into the atmosphere.

19. The system of claim 18 in which the diverter valve is controlled based on the operating conditions of the ICE.

20. The system of claim 16 which includes control means for discharging all or a portion of the exhaust gas stream into the atmosphere without passing through the treatment zone.

\* \* \* \* \*